US007719600B2

(12) United States Patent
Kaihara et al.

(10) Patent No.: US 7,719,600 B2
(45) Date of Patent: May 18, 2010

(54) IMAGE CAPTURING APPARATUS, CONTROL METHOD THEREFOR, AND PROGRAM REGARDING FOREIGN SUBSTANCE REMOVAL

(75) Inventors: Shoji Kaihara, Yokohama (JP); Atsushi Katayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 448 days.

(21) Appl. No.: 11/739,394

(22) Filed: Apr. 24, 2007

(65) Prior Publication Data
US 2007/0211162 A1 Sep. 13, 2007

Related U.S. Application Data

(63) Continuation of application No. PCT/JP2007/053999, filed on Mar. 2, 2007.

(30) Foreign Application Priority Data

Mar. 9, 2006 (JP) ............................. 2006-063978
Jul. 20, 2006 (JP) ............................. 2006-198709

(51) Int. Cl.
*H04N 5/225* (2006.01)
(52) U.S. Cl. .................................... 348/335
(58) Field of Classification Search ................ 348/335, 348/340, 373, 374, 207.99
See application file for complete search history.

(56) References Cited

U.S. PATENT DOCUMENTS

| 6,895,368 | B2* | 5/2005 | Murakami .................. 702/188 |
| 7,215,372 | B2* | 5/2007 | Ito et al. ..................... 348/340 |
| 7,324,148 | B2* | 1/2008 | Takizawa et al. ............. 348/340 |
| 7,349,014 | B2* | 3/2008 | Higashihara ................. 348/241 |
| 2003/0202114 | A1* | 10/2003 | Takizawa et al. ............ 348/335 |
| 2004/0017480 | A1* | 1/2004 | Higashihara ............ 348/207.99 |
| 2004/0047625 | A1 | 3/2004 | Ito et al. |

(Continued)

FOREIGN PATENT DOCUMENTS

CN 1448776 A 10/2003

(Continued)

OTHER PUBLICATIONS

The above reference was cited in a Apr. 7, 2009 Japanese Office Action that issued in Japanese Patent Application No. 2006-159784.

(Continued)

*Primary Examiner*—Jason Chan
*Assistant Examiner*—Nicholas G Giles
(74) *Attorney, Agent, or Firm*—Cowan, Liebowitz & Latman, P.C.

(57) ABSTRACT

This invention can more efficiently remove, at a more effective timing, a foreign substance such as dust adhering on an optical member inserted on the image capturing optical axis. An image capturing apparatus having an image sensor which photo-electrically converts an object image includes an optical element arranged on the image sensor on a side close to an object, a foreign substance removing unit which removes a foreign substance adhering to the surface of the optical element, an instruction unit which issues instructions to power on and power off the image capturing apparatus, and a control unit which controls the foreign substance removing unit to execute a foreign substance removing operation in accordance with the instruction to power off the image capturing apparatus by the instruction unit.

7 Claims, 18 Drawing Sheets

U.S. PATENT DOCUMENTS

2005/0104997 A1\* 5/2005 Nonaka ...................... 348/360

FOREIGN PATENT DOCUMENTS

| JP | 09-200591 | 7/1997 |
| JP | 2002-204379 | 7/2002 |
| JP | 2003-330082 | 11/2003 |
| JP | 2004-184949 A | 7/2004 |
| JP | 2004-264580 | 9/2004 |
| JP | 2005-159711 | 6/2005 |
| JP | 2006-060428 | 3/2006 |

OTHER PUBLICATIONS

PCT/IB/338, PCT/IB/373, PCT/ISA/237, and PCT/ISA/210 which comprise an English translation of Form PCT/ISA/237 (International Preliminary Report on Patentability for PCT/JP2007/053999) submitted to the USPTO on May 30, 2007.

The above references were cited in a Dec. 11, 2009 Chinese Office Action that issued in Chinese Patent Application No. 200780000638.3, a copy of which is enclosed with English Translation.

The above reference was cited in a Feb. 10, 2010 European Search Report of the counterpart European Patent Application No. 07737647.3, a copy of which is not enclosed.

\* cited by examiner

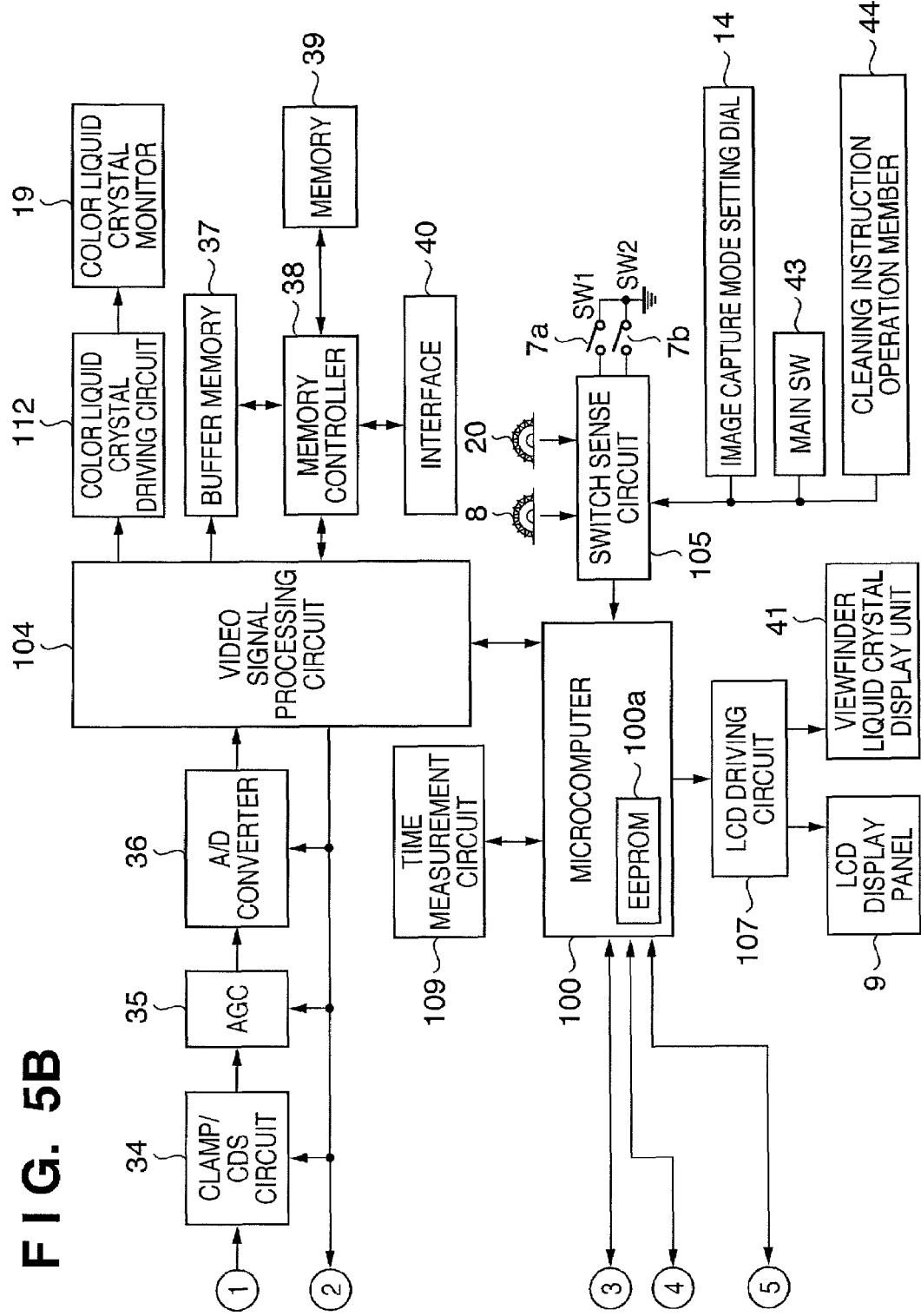

F I G. 14
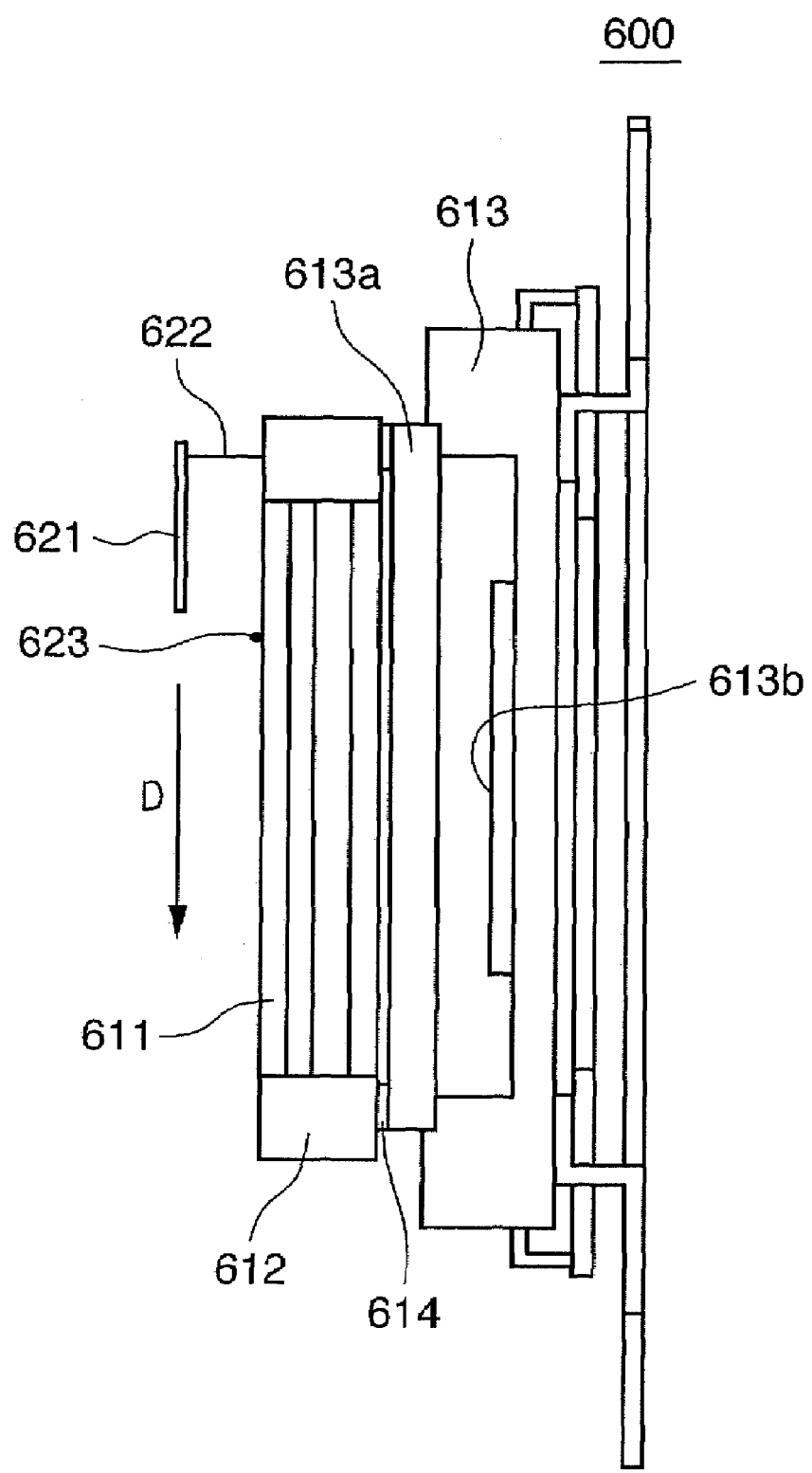

IMAGE CAPTURING APPARATUS, CONTROL METHOD THEREFOR, AND PROGRAM REGARDING FOREIGN SUBSTANCE REMOVAL

CROSS-REFERENCE TO RELATED APPLICATIONS

This application is a continuation of International Application No. PCT/JP2007/053999, filed Mar. 2, 2007, the entire disclosure of which is hereby incorporated by reference.

TECHNICAL FIELD

The present invention relates to a technique for removing a foreign substance such as dust adhering to the surface of an optical member inserted on the image capturing optical axis in an image capturing apparatus.

BACKGROUND ART

An image capturing apparatus such as a digital camera which captures an image by converting an image signal into an electrical signal receives an image capturing light beam using an image sensor, converts the photo-electrically converted signal output from the image sensor into image data, and records the resultant image data on a recording medium such as a memory card. A CCD (Charge Coupled Device) or C-MOS (Complementary Metal Oxide Semiconductor) is known as the image sensor.

In such an image capturing apparatus, an optical low-pass filter and infrared cut filter are arranged on the object side of the image sensor. It has been known that when foreign substances such as dust adhere to the surfaces of these filters or a cover glass of the image sensor, the adhesion portion is seen in a captured image as a black point to result in degradation in its quality.

Especially in a interchangeable single-lens reflex digital camera, since mechanical actuating units such as a shutter or quick return mirror are set near the image sensor, foreign substances such as dust produced from these actuating units sometimes adhere on the image sensor or low-pass filter. Also, dust or the like sometimes enters the camera main body from the opening of the lens mount and adheres on it (what is it?) during lens interchange.

As a prior art for solving the above problem, Japanese Patent Laid-Open No. 2002-204379 discloses a technique for providing, on the object side of the image sensor, a dustproof curtain which transmits an image capturing light beam, to cause a piezoelectric element to vibrate the dustproof curtain, thereby removing the foreign substance such as dust adhering to the surface of the dustproof curtain.

Japanese Patent Laid-Open No. 2003-330082 discloses a technique for executing the vibration operation for removing a foreign substance such as dust after activating the system upon power ON, upon attaching/detaching the lens or accessory unit, or prior to a release (image capturing) operation.

Japanese Patent Laid-Open No. 2004-264580 discloses a technique for changing the vibration mode of the vibration operation for removing a foreign substance such as dust, between a timing synchronized with a release (image capturing) operation and a timing corresponding to manual operation or lens attachment/detachment.

To remove the foreign substance adhering to the surface of the dustproof curtain, Japanese Patent Laid-Open No. 2002-204379 described above applies a voltage to the piezoelectric element which connects to the dustproof curtain, to vibrate the dustproof curtain by driving the piezoelectric element. In this case, removal of the foreign substance adhering to the dustproof curtain requires scattering the foreign substance from the dustproof curtain by applying a force stronger than the adhesion force of the foreign substance to it, so large energy is necessary. However, Japanese Patent Laid-Open No. 2002-204379 does not consider any method of efficiently driving the piezoelectric element to effectively remove the foreign substance when vibrating the dustproof curtain. This leads to high power consumption.

Japanese Patent Laid-Open No. 2003-330082 executes the vibration operation for removing a foreign substance such as dust not only when vibrating the dustproof curtain after activating the system upon power ON and when attaching/detaching the lens or accessory unit but also for every release operation. Therefore, the influence of power supply energy consumed by vibrating the dustproof curtain on the number of photographable images is not negligible.

Japanese Patent Laid-Open No. 2004-264580 executes the vibration operation for removing a foreign substance such as dust in a low power consumption mode only at a slow shutter speed or only for the valve in a release operation at a timing other than that corresponding to manual operation or lens attachment/detachment. However, the vibration operation with low power consumption, i.e., the vibration operation with low foreign substance removal capability sometimes fails to sufficiently remove the dust. This may only result in wasteful power consumption.

Both of the above-described prior arts execute the vibration operation for removing a foreign substance such as dust in lens interchange. Actually, a foreign substance such as dust in the outside air can readily enter the mirror box in lens interchange because the mount opens and the interior of the mirror box is exposed to the outside air.

However, even when a foreign substance such as dust enters the mirror box at this time, it merely adheres to the wall surface or structure in the mirror box in many cases. Therefore, the foreign substance rarely enters the region beyond the shutter curtain while it is closed. That is, while the shutter curtain is closed, a foreign substance rarely adheres to the surface of the optical member such as a filter which covers the image sensor unit. It is not always good to execute the vibration operation for removing a foreign substance such as dust in lens interchange.

Various references reveal that the foreign substance such as dust adhering on the optical member such as a filter strongly produces an adhesion force using, e.g., Van der Waals force, liquid cross-linking force, and electrostatic force. As measures against the adhesion due to an electrostatic force, there have been known a variety of techniques for, e.g., making the surface of the optical member such as a filter fall to GND to drop the surface potential, thereby removing the charges of the surface and preventing charging of the surface.

Various kinds of foreign substances such as dust adhere on the optical member such as a filter. It has been clarified by experiments that when a foreign substance is left adhered for a long period of time, its adhesion force generally increases and makes it hard to remove the foreign substance. This phenomenon occurs because the adhesion force such as a liquid cross-linking force increases as the foreign substance condenses upon a change in environment, i.e., temperature/humidity, or because the foreign substance gets stronger adhesion as the dirt repeatedly swells and dries upon a change in temperature/humidity. Also, an elastic material such as rubber gets stronger adhesion because fat and oil contained in itself bleed over time.

The present invention has been made in consideration of the above problems, and has as its object to more efficiently remove, at a more effective timing, a foreign substance such as dust adhering on an optical member inserted on the image capturing optical axis.

DISCLOSURE OF INVENTION

In order to solve the above problems and to achieve the object, according to a first aspect of the present invention, there is provided an image capturing apparatus including an image sensor which photo-electrically converts an object image, characterized by comprising an optical element arranged on the image sensor on a side close to an object, foreign substance removing means for removing a foreign substance adhering to a surface of the optical element, instruction means for issuing instructions to power on and power off the image capturing apparatus, and control means for controlling the foreign substance removing means to execute a foreign substance removing operation in accordance with the instruction to power off the image capturing apparatus by the instruction means.

According to a second aspect of the present invention, there is provided a method of controlling an image capturing apparatus including an image sensor which photo-electrically converts an object image and an optical element arranged on the image sensor on a side close to an object, characterized by comprising a foreign substance removing step of removing a foreign substance adhering to a surface of the optical element, an instruction step of issuing instructions to power on and power off the image capturing apparatus, and a control step of controlling to execute a foreign substance removing operation in the foreign substance removing step in accordance with the instruction to power off the image capturing apparatus in the instruction step.

EFFECTS OF THE INVENTION

According to the present invention, it is achieved to more efficiently remove, at a more effective timing, a foreign substance such as dust adhering on an optical member inserted on the image capturing optical axis.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 5A and 5B are block diagrams showing the electrical arrangement of the single-lens reflex digital camera according to the second embodiment;

FIG. 14 is a view showing a device which removes dust adhering on an optical low-pass filter in the third embodiment;

BEST MODE FOR CARRYING OUT THE INVENTION

Preferred embodiments of the present invention will be described in detail below with reference to the accompanying drawings.

First Embodiment

The schematic arrangement of a camera according to the first embodiment of the present invention will be explained first.

Figure 1:
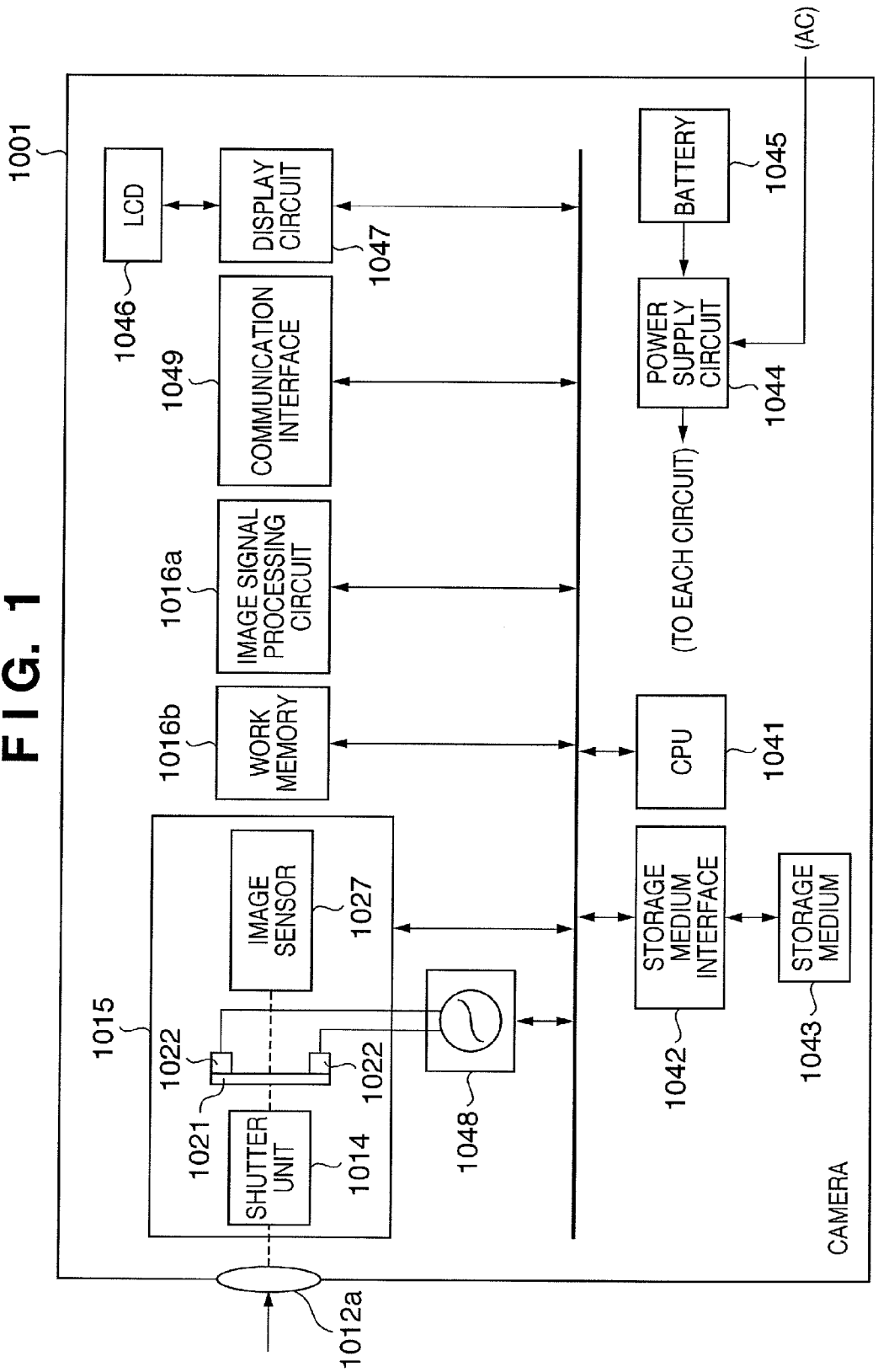
FIG. 1 is a block diagram showing a single-lens reflex digital camera according to the first embodiment of the present invention.

FIG. 1 is a block diagram showing the schematic arrangement, mainly, the electrical arrangement of the camera according to the first embodiment of the present invention.

A plurality of circuit substrates are arrayed in a camera 1001 and form various kinds of electrical circuits. As shown in FIG. 1, the electrical arrangement of the camera 1001 includes a CPU 1041, image signal processing circuit 1016a, work memory 1016b, storage medium 1043, storage medium interface 1042, display unit 1046, display circuit 1047, battery 1045, power supply circuit 1044, dustproof filter driving unit 1048, and USB and IEEE1394 serving as a communication interface 1049. The CPU 1041 serves as a control means, i.e., control circuit for systematically controlling the overall camera 1001. The image signal processing circuit 1016a executes various kinds of signal processes such as a signal process for converting an image signal acquired by an image sensor 1027 into a signal in a format compatible to recording. The work memory 1016b temporarily records the image signal and image data processed by the image signal processing circuit 1016a, and various types of information associated with them. The storage medium 1043 records the image data for recording in a predetermined format, which is generated by the image signal processing circuit 1016a. The storage medium interface 1042 electrically connects the storage medium 1043 to the electrical circuits of the camera 1001.

The display unit 1046 includes a liquid crystal display (LCD) which displays an image. The display circuit 1047 electrically connects the display unit 1046 to the camera 1001, receives the image signal processed by the image signal processing circuit 1016a, and generates an image signal for display that is optimal for display using the display unit 1046. The battery 1045 includes a secondary battery such as a dry cell. The power supply circuit 1044 receives power from an external power supply (AC), which is provided by the battery 1045 or a predetermined connecting cable (not shown), controls the power to be suitable for operating the camera 1001, and distributes the power to the electrical circuits. The dustproof filter driving unit 1048 includes an oscillator and serves as an electrical circuit (driving circuit) for driving and controlling a piezoelectric element 1022 in accordance with a control signal output from the CPU 1041 to vibrate a dustproof filter 1021 included in an image capturing unit 1015. The communication interface 1049 transfers a dust profile and captured image to the PC. Reference numeral 1012a is a lens; and 1014, a shutter unit.

Figure 2:
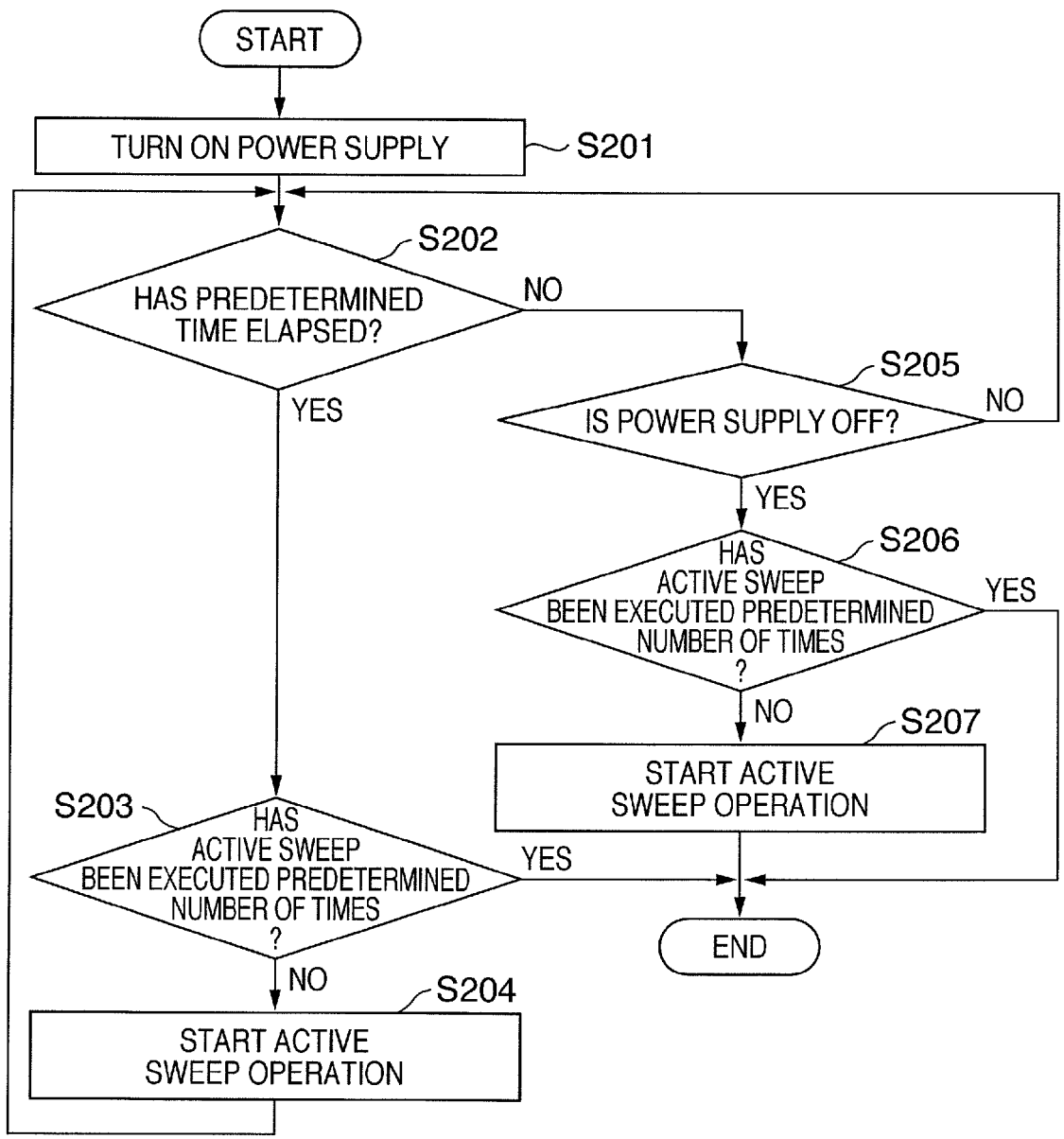
FIG. 2 is a flowchart showing the operation of the single-lens reflex digital camera according to the first embodiment.

The dust removing operation of the digital image capturing apparatus will be explained next with reference to FIG. 2. As the power supply is turned on (S201), it is determined whether a predetermined time has elapsed from when an active sweep (the vibration operation of the dustproof filter 1021) is executed at the previous time (S202). If the predetermined time has elapsed (YES in step S202), it is determined whether the active sweep has been executed a predetermined number of times (S203). If the active sweep has not been executed the predetermined number of times (NO in step S203), the active sweep starts again (S204). If the predetermined time has not elapsed (NO in step S202), it is detected whether the power supply has been turned off (S205). If the power supply has been turned off (YES in step S205), it is determined whether the active sweep has been executed the predetermined number of times (S206). If the active sweep has not been executed the predetermined number of times (NO in step S206), the active sweep starts again (S207). If the power supply is ON (NO in step S205), the process waits until the predetermined time elapses again (S202).

As has been described above, according to the first embodiment, since it is hard to clean the dust that has been left adhering on the dustproof filter for a predetermined time in the digital image capturing apparatus, the vibration operation is executed after the elapse of the predetermined time. This makes it possible to facilitate cleaning of the dust.

When the digital image capturing apparatus is powered off, the dustproof filter is vibrated to clean the dust. This prevents the dust from being left adhering on the dustproof filter for a long period of time even when the user leaves the digital image capturing apparatus unused after power OFF.

Second Embodiment

Figure 3:
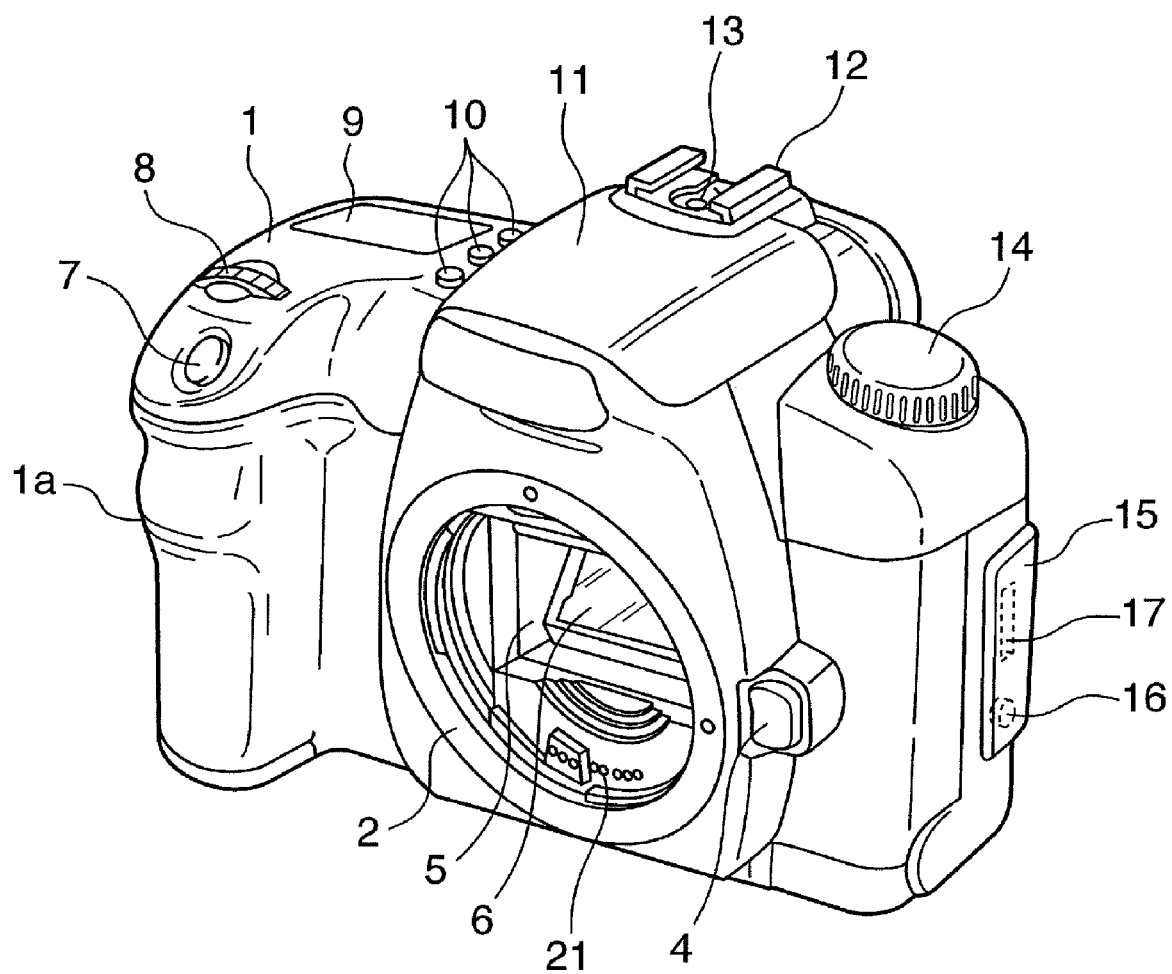
FIG. 3 is a front perspective view showing the outer appearance of a single-lens reflex digital camera according to the second embodiment of the present invention.
Figure 4:
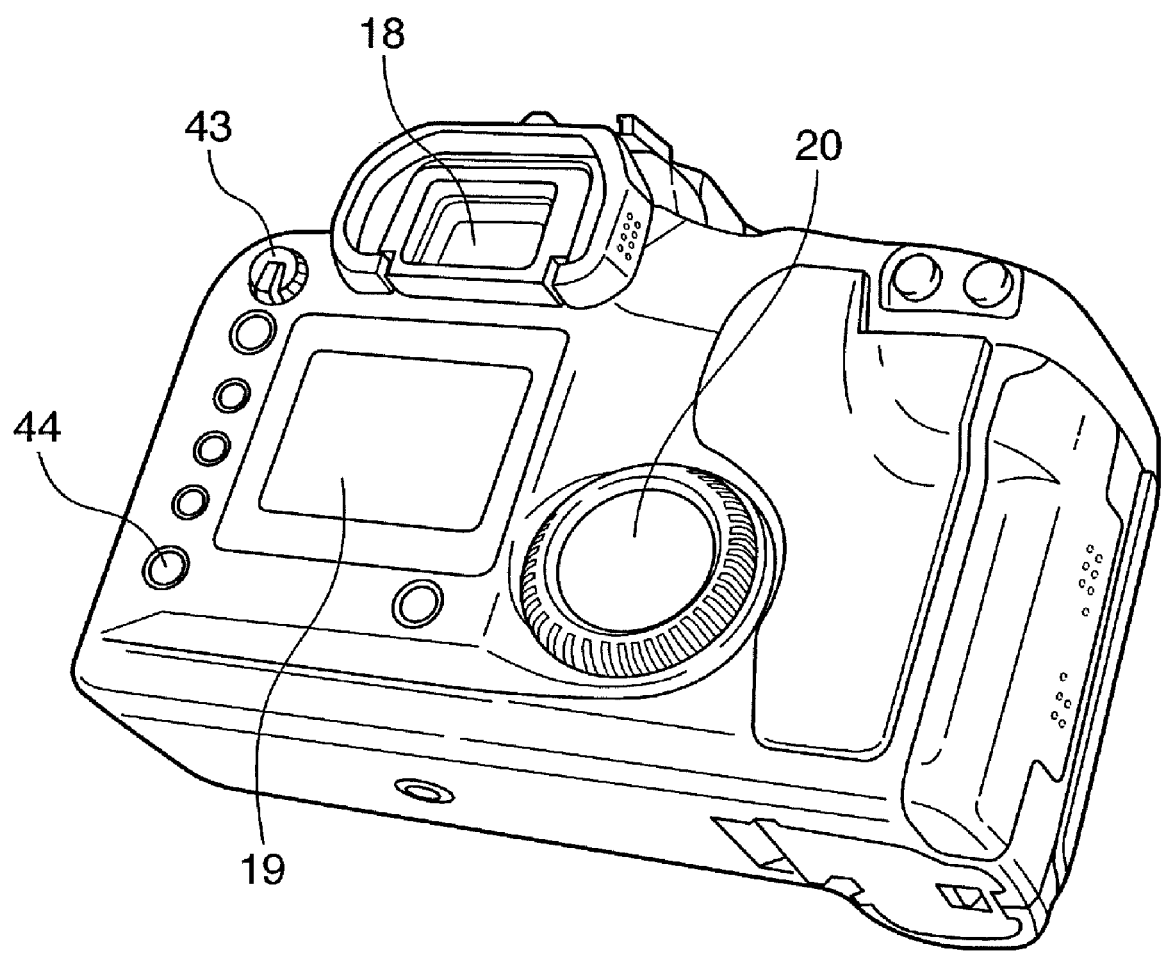
FIG. 4 is a rear perspective view showing the outer appearance of the single-lens reflex digital camera according to the second embodiment.

FIGS. 3 and 4 are perspective views showing the outer appearance of a single-lens reflex digital camera according to the second embodiment of the present invention. More specifically, FIG. 3 is a front perspective view of the camera while a photographing lens unit is detached, and FIG. 4 is a rear perspective view of the camera.

Referring to FIG. 3, reference numeral 1 denotes a camera main body having a gripping portion 1a which extends forward such that the user can easily, stably grip the camera in image capture. Reference numeral 2 denotes a mount portion which fixes a detachable photographing lens unit 210 (see FIG. 5) to the camera main body 1. Mount contacts 21 have a function of communicating, e.g., a control signal, status signal, and data signal between the camera main body 1 and the photographing lens unit 210, and supplying power to the photographing lens unit 210 side. The mount contacts 21 may be able to execute not only electrical communication but also optical communication, speech communication, and the like.

Reference numeral 4 denotes a lens lock cancel button to be pressed in detaching the photographing lens unit. Reference numeral 5 denotes a mirror box which is accommodated in the camera housing and to which the image capturing light beam having passed through the photographing lens 200 is guided. A quick return mirror 6 is placed in the mirror box 5. The quick return mirror 6 can be held at 45° with respect to the image capturing optical axis to guide the image capturing light beam to a pentagonal prism 22 (see FIG. 5), or held at a position retreated from the image capturing light beam to guide it to an image sensor 33 (see FIG. 5).

On the gripping side at the upper portion of the camera, a shutter button 7 serving as an activation switch for starting image capture, a main operation dial 8 for setting the shutter speed and lens F-number in accordance with the operation mode in image capture, and a set button 10 for setting the operation mode of the image capturing system are provided. An LCD display panel 9 displays parts of the operation results of these operation members.

The shutter button 7 turns on a switch SW1 denoted by reference numeral 7a (to be described later) by the first stroke (when pressed halfway), and turns on a switch SW2 denoted by reference numeral 7b (to be described later) by the second stroke (when pressed fully).

The set button 10 serves to, e.g., set whether to execute continuous shooting or image capture of one frame when the shutter button 7 is pressed once, and set a self image capture mode. The LCD display panel 9 displays these setting statuses.

At the center of the upper portion of the camera, an electronic flash unit 11 which pops up from the camera main body, a shoe groove 12 for electronic flash attachment, and an electronic flash contact 13 are arranged. An image capture mode setting dial 14 is arranged on the right side of the upper portion of the camera.

An openable/closable external terminal lid 15 is arranged on the side surface opposite to the gripping side. A video signal output jack 16 and USB output connector 17 are accommodated as external interfaces inside the external terminal lid 15.

Referring to FIG. 4, a viewfinder eyepiece window 18 is mounted at the upper portion of the camera on its rear side, and a color liquid crystal monitor 19 which allows image display is set around the center of the rear surface. A sub operation dial 20 juxtaposed to the color liquid crystal monitor 19 plays an auxiliary role of the function of the main operation dial 8, and is used to, e.g., set the exposure compensation amount relative to an appropriate exposure value calculated by an automatic exposure unit, in an AE mode of the camera. In a manual mode in which the user sets the shutter speed and lens F-number by his/her will, the main operation dial 8 sets the shutter speed and the sub operation dial 20 sets the lens F-number. The sub operation dial 20 is also used to display and select captured images to be displayed on the color liquid crystal monitor 19.

Reference numeral 43 denotes a main switch for activating or deactivating the operation of the camera.

Reference numeral 44 denotes a cleaning instruction operation member for activating the cleaning mode and instructing to shake off the dirt adhering on the low-pass filter. Details of the cleaning instruction operation member 44 will be described later.

Figure 5A:
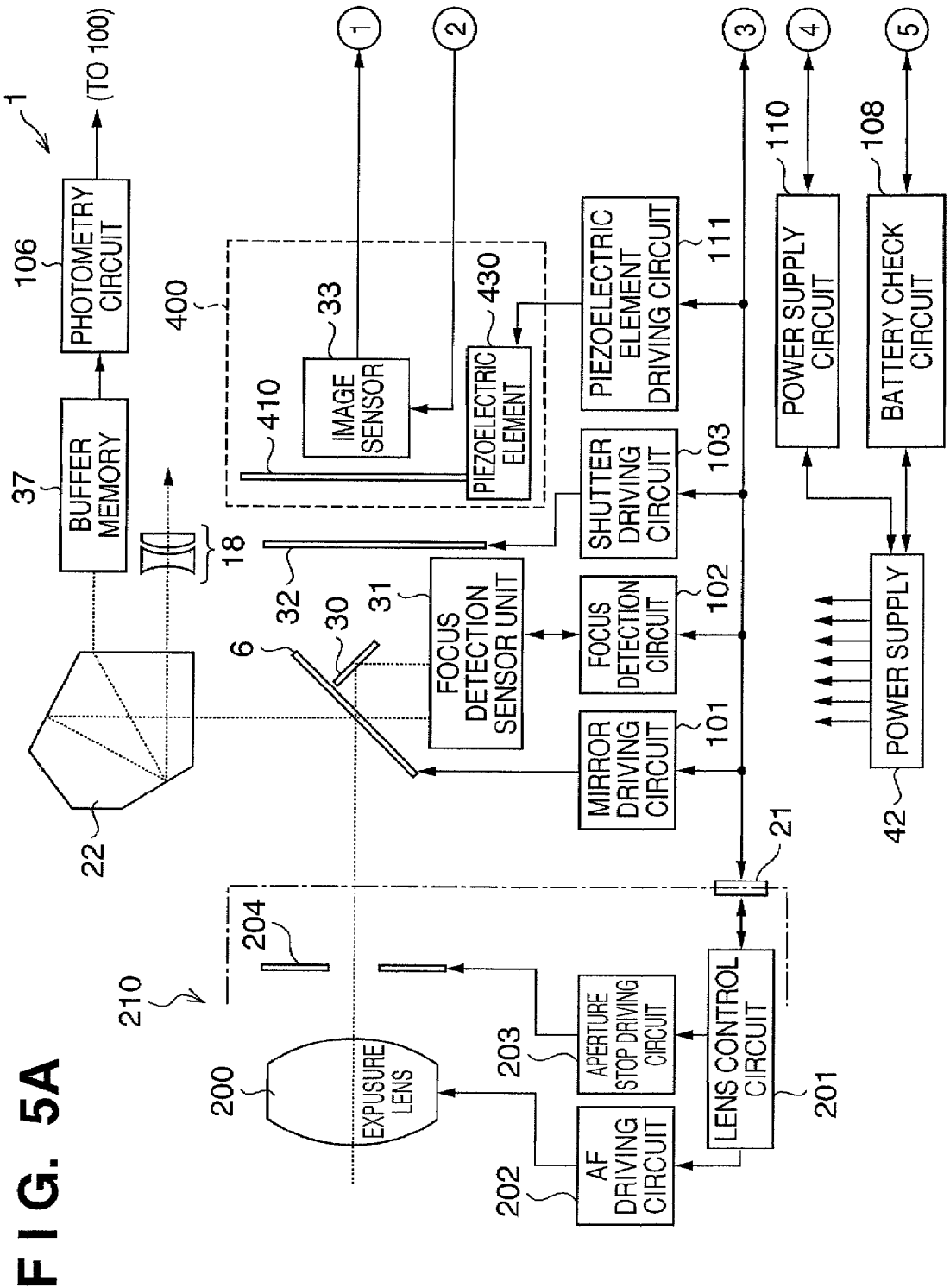

FIGS. 5A and 5B are block diagrams showing the major electrical arrangement of the single-lens reflex digital camera according to the second embodiment. The same reference numerals as in FIGS. 3 and 4 described above denote the common constituent components in FIG. 5.

Reference numeral 100 denotes a central processing unit (to be referred to as an MPU hereinafter) which includes a microcomputer built in the camera main body 1. The MPU 100 executes various kinds of processes and instructions for the constituent components to control the operation of the camera.

Reference numeral 100a denotes an EEPROM which is built in the MPU 100 and can store time measurement information of a time measurement circuit 109 and other information.

The MPU 100 connects to a mirror driving circuit 101, focus detection circuit 102, shutter driving circuit 103, video signal processing circuit 104, switch sense circuit 105, photometry circuit 106, LCD driving circuit 107, battery check circuit 108, the time measurement circuit 109, a power supply circuit 110, and piezoelectric element driving circuit 111. These circuits operate under the control of the MPU 100.

The MPU 100 communicates, via the mount contacts 21, with a lens control circuit 201 built in the photographing lens unit 210. The mount contacts 21 also have a function of transmitting a signal to the MPU 100 upon being connected to the photographing lens unit 210. With this operation, the lens control circuit 201 communicates with the MPU 100 to be able to drive a photographing lens 200 and aperture stop 204 in the photographing lens unit 210 via an AF driving circuit 202 and aperture stop driving circuit 203.

Although the photographing lens 200 is shown as one lens in the second embodiment for convenience, it is formed from a large number of lenses in practice.

The AF driving circuit 202 includes, e.g., a stepping motor, and focuses the image capturing light beam on the image sensor 33 by changing the focus lens position in the photographing lens 200 under the control of the lens control circuit 201. The aperture stop driving circuit 203 includes, e.g., an auto iris, and obtains the optical F-number by changing the aperture stop 204 using the lens control circuit 201.

The quick return mirror 6 guides the image capturing light beam passing through the photographing lens 200 to the pentagonal prism 22, and partially transmits and guides it to a submirror 30. The submirror 30 guides the transmitted image capturing light beam to a focus detection sensor unit 31.

The mirror driving circuit 101 serves to drive the quick return mirror 6 to a position at which the object image is observable via the viewfinder and to a position retreated from the image capturing light beam. At the same time, the mirror driving circuit 101 drives the submirror 30 to a position at which the image capturing light beam is guided to the focus detection sensor unit 31 and to a position retreated from the image capturing light beam. More specifically, the mirror driving circuit 101 includes, e.g., a DC motor and gear train.

Reference numeral 31 denotes the focus detection sensor unit of a known phase difference scheme, which includes a field lens and reflecting mirror that are arranged near the imaging plane (not shown), a secondary imaging lens, an aperture stop, and a line sensor including a plurality of CCDs. The signal output from the focus detection sensor unit 31 is supplied to the focus detection circuit 102 and converted into an object image signal. The resultant signal is transmitted to the MPU 100. The MPU 100 executes a focus detection arithmetic operation using a phase difference detection method on the basis of the object image signal. The MPU 100 calculates the defocus amount and defocus direction. On the basis of the calculated defocus amount and defocus direction, the MPU 100 drives the focus lens in the photographing lens 200 to the in-focus position via the lens control circuit 201 and AF driving circuit 202.

Reference numeral 22 denotes the pentagonal prism which serves as an optical member for converting the image capturing light beam reflected by the quick return mirror 6 into an erect image and reflecting it. The user can observe the object image from the viewfinder eyepiece window 18 via the finder optical system.

The pentagonal prism 22 also partially guides the image capturing light beam to a photometry sensor 37. Upon receiving the output from the photometry sensor 37, the photometry circuit 106 converts it into a luminance signal in each area on the observation plane, and outputs the luminance signal to the MPU 100. The MPU 100 calculates the exposure value from the obtained luminance signal.

Reference numeral 32 denotes a mechanical focal plane shutter which shields the image capturing light beam while the user observes the object image via the viewfinder. In image capture, the focal plane shutter 32 obtains a predetermined exposure time from the traveling time difference between front vanes and rear vanes (not shown) in accordance with a release signal. The shutter driving circuit 103 controls the focal plane shutter 32 upon receiving the command from the MPU 100.

Reference numeral 33 denotes the image sensor which uses a CMOS serving as an image capturing device. The image capturing device may take various forms such as a CCD, CMOS, and CID.

Reference numeral 34 denotes a clamp/CDS (Correlated Double Sampling) circuit which can execute a fundamental analog process before A/D conversion and change the clamp level. Reference numeral 35 denotes an AGC (Automatic Gain Controller) which can execute a fundamental analog process before A/D conversion and change the AGC basic level. Reference numeral 36 denotes an A/D converter which converts the analog output signal from the image sensor 33 into a digital signal.

Reference numeral 410 denotes an optical low-pass filter which is formed by bonding and stacking a plurality of phase plates and a plurality of birefringent plates made of quartz and further bonding them to an infrared cut filter.

Reference numeral 430 denotes a stacked piezoelectric element which vibrates in accordance with a voltage signal supplied from the piezoelectric element driving circuit 111 that has received the command from the MPU 100. The piezoelectric element 430 conducts the vibration to the optical low-pass filter 410.

Reference numeral 400 denotes an image capturing unit which is obtained by unitizing the optical low-pass filter 410, piezoelectric element 430, and image sensor 33 together with other components (to be described later). The detailed structure of the image capturing unit 400 will be described later.

Reference numeral 104 denotes the video signal processing circuit which executes general image processes such as a gamma/Knee process, a filter process, and an information composition process for monitor display for the digital image data. Via a color liquid crystal driving circuit 112, the color liquid crystal monitor 19 displays the image data for monitor display from the video signal processing circuit 104.

The video signal processing circuit 104 can even store image data in a buffer memory 37 via a memory controller 38 in accordance with the instruction from the MPU 100. The video signal processing circuit 104 also has a function of executing an image data compression process such as JPEG. In continuous image capture such as continuous shooting, it is also possible to temporarily store image data in the buffer memory 37 and sequentially read out unprocessed image data via the memory controller 38. The video signal processing circuit 104 can sequentially execute an image process and compression process irrespective of the rate of image data input from the A/D converter 36.

The memory controller 38 also has a function of causing a memory 39 to store image data input from an external interface 40 (equivalent to the video signal output jack 16 and USB output connector 17 shown in FIG. 3), and a function of causing the external interface 40 to output the image data stored in the memory 39. The memory 39 is, e.g., an electronic flash memory detachable from the camera main body.

Reference numeral 105 denotes the switch sense circuit which transmits an input signal to the MPU 100 in accordance with the operation status of each switch. Reference numeral 7a denotes the switch SW1 which is turned on by the first stroke (half pressing) of the shutter button 7. Reference numeral 7b denotes the switch SW2 which is turned on by the second stroke (full pressing) of the shutter button 7. As the shutter button 7 turns on the switch SW2, an image capture start instruction is transmitted to the MPU 100. The switch sense circuit 105 connects to the main operation dial 8, sub operation dial 20, image capture mode setting dial 14, main switch 43, and cleaning instruction operation member 44.

Reference numeral 107 denotes the LCD driving circuit which drives the LCD display panel 9 or a viewfinder liquid crystal display unit 41 in accordance with the instruction from the MPU 100.

Reference numeral 108 denotes the battery check circuit which checks the battery for a predetermined period of time in accordance with the signal from the MPU 100, and transmits the detection output to the MPU 100. Reference numeral 42 denotes a power supply unit which supplies necessary power to the constituent components of the camera.

Reference numeral 109 denotes the time measurement circuit which measures the date and the time from when the main switch 43 is turned off until it is turned on at the next time. The time measurement circuit 109 can transmit the measurement result to the MPU 100 in accordance with the command from the MPU 100.

The detailed structure of the image capturing unit 400 will be explained with reference to FIGS. 6 to 12.

Figure 6:
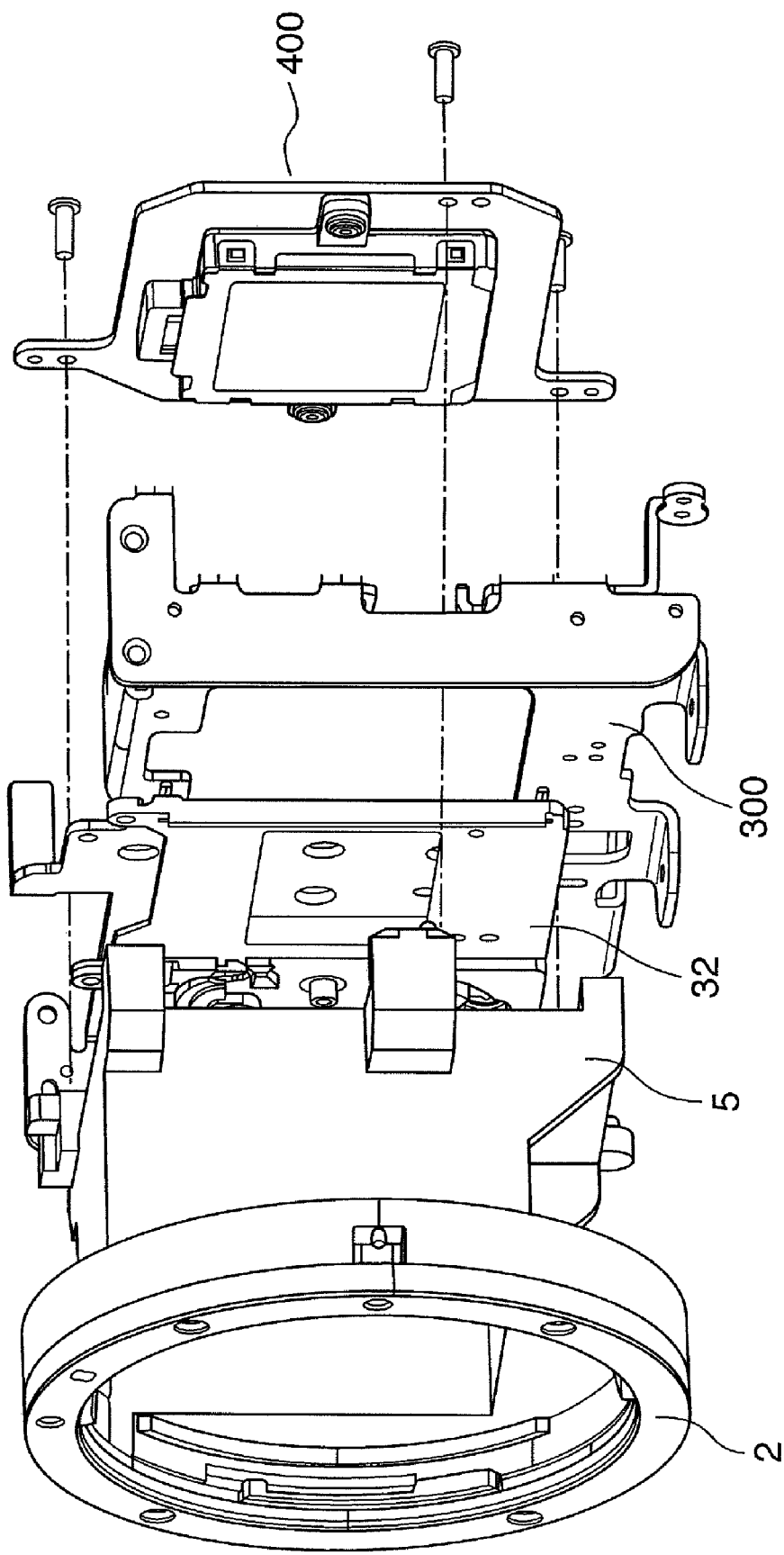
FIG. 6 is an exploded perspective view of the schematic internal structure of the camera to show the holding structure around a low-pass filter and image sensor.

FIG. 6 is an exploded perspective view of the schematic internal structure of the camera to show the holding structure around the low-pass filter and image sensor.

The focal plane shutter 32, a main body chassis 300 serving as the framework of the camera main body, and the image capturing unit 400 are housed in the mirror box 5 in this order from the object side. The image capturing unit 400 is fixed such that the image sensing plane of the image sensor 33 becomes parallel to the attachment surface of the mount portion 2, that serves as a reference with which the photographing lens unit is to be attached, at a predetermined distance.

Figure 7:
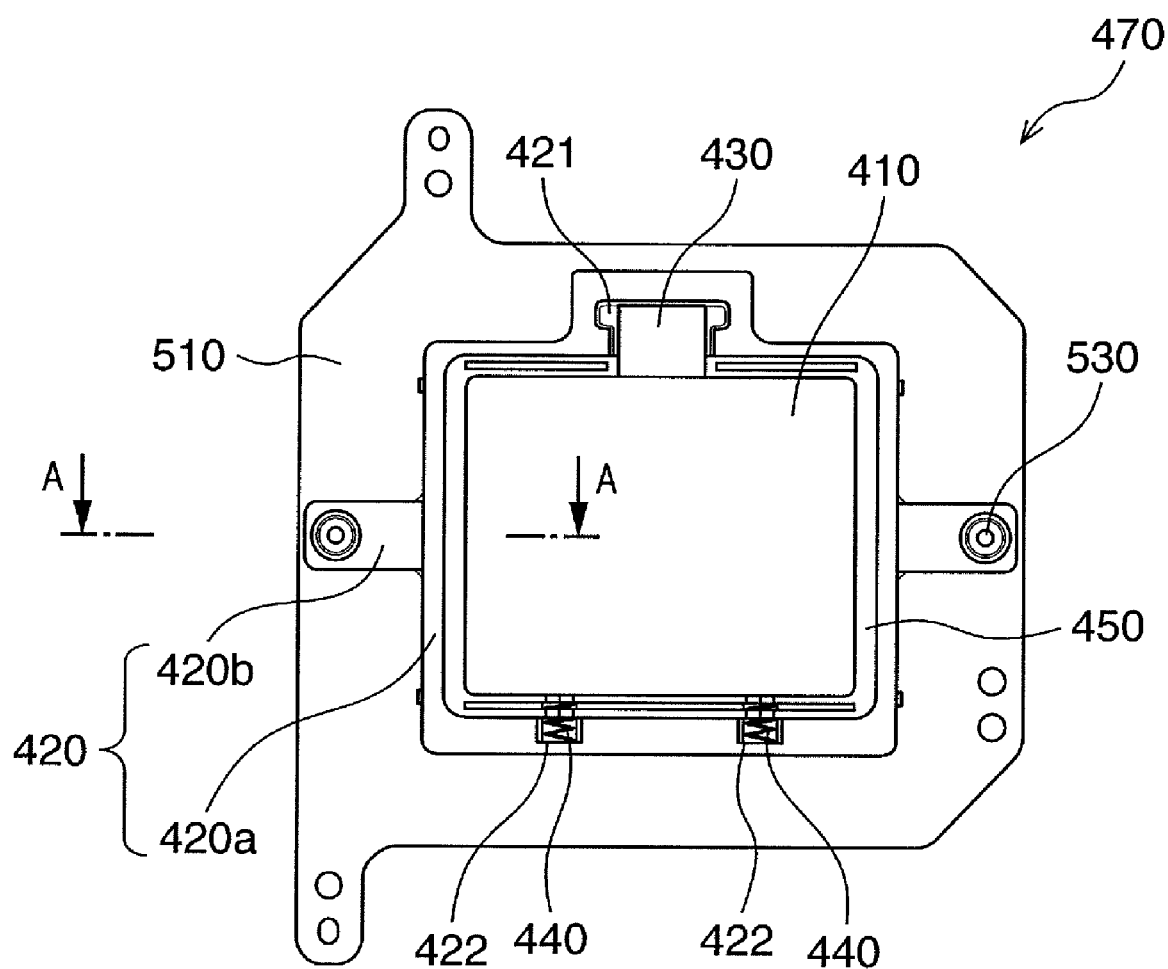
FIG. 7 is a front view showing parts of the constituent members of a low-pass filter holding unit.
Figure 8:
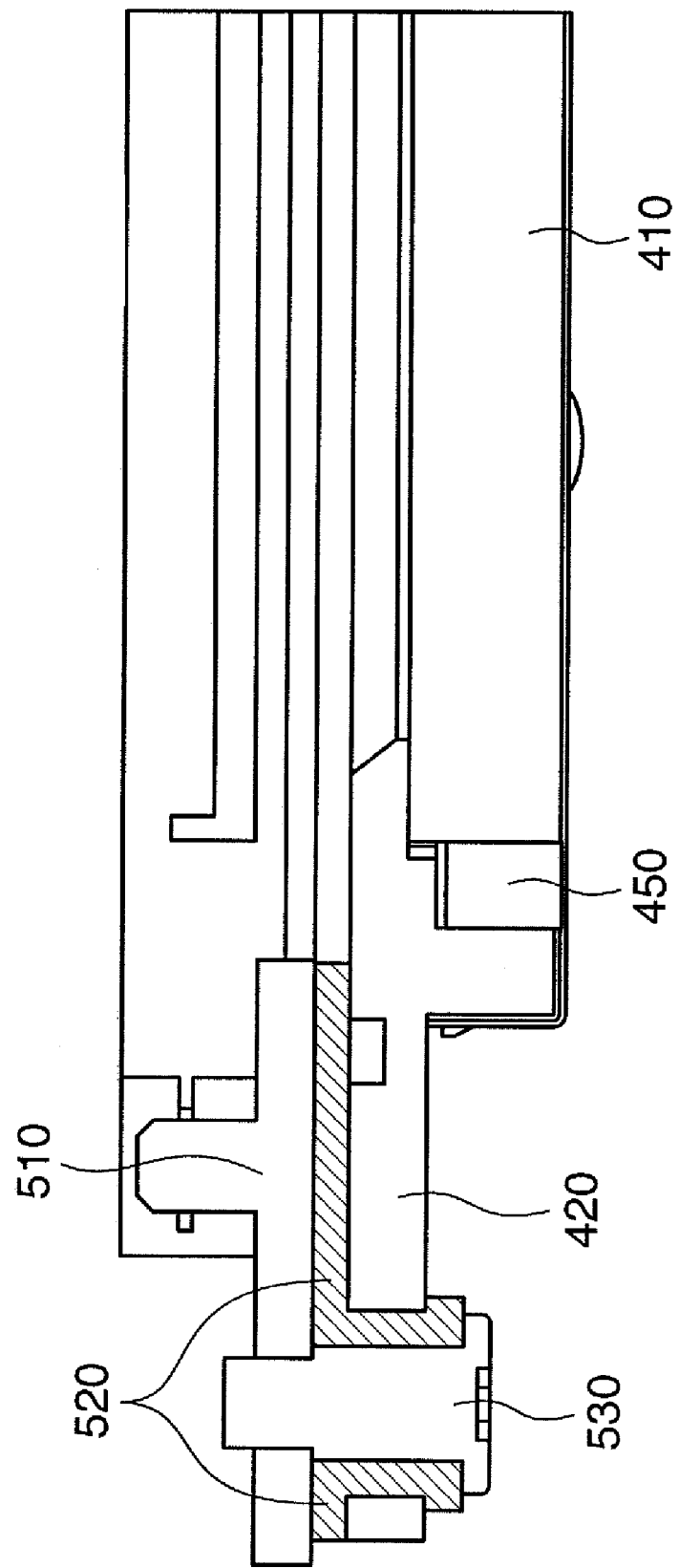
FIG. 8 is a sectional view of the low-pass filter holding unit, which is taken along a line A-A in FIG. 7.

FIG. 7 is a front view showing parts of the constituent members of a low-pass filter holding unit 470. FIG. 8 is a sectional view taken along a line A-A in FIG. 7.

Referring to FIGS. 7 and 8, reference numeral 510 denotes a plate-like image sensor holding member which has a rectangular opening and fixes the image sensor 33 into the opening so as to expose the image sensor 33. The image sensor holding member 510 has, at its periphery, three arm portions for fixing itself to the mirror box 5 with screws. Referring to FIG. 8, reference numeral 520 denotes a rubber sheet (to be described later); and 530, a stepped screw (to be described later).

Reference numeral 420 denotes a low-pass filter holding member which is made of a resin or metal and has a frame portion 420a that surrounds the periphery of the optical low-pass filter 410, and an arm portion 420b that extends to left and right and holds the attachment. An accommodation unit 421 for accommodating the piezoelectric element 430 is formed on one side of the frame portion 420a. The one end face of the piezoelectric element 430 is fixed to the frame portion 420a by, e.g., bonding.

Of the sides of the frame portion 420a, on the side opposing the side having the accommodation unit 421, an accommodation unit 422 for accommodating a biasing member 440 having a spring force is formed to bias the optical low-pass filter 410 against the piezoelectric element 430.

That is, the optical low-pass filter 410 is set to be clamped between the piezoelectric element 430 and the biasing member 440 within the same plane of the low-pass filter holding member 420. With this arrangement, the optical low-pass filter 410 can move while following the expansion/contraction motion of the piezoelectric element 430.

The biasing member 440 may be a plate spring or coil spring made of a metal or a high-molecular polymer such as rubber or plastic as long as it is an elastic body. In the second embodiment, the biasing member 440 is a separate member. However, the low-pass filter holding member 420 may have a spring force so that the optical low-pass filter 410 moves while following the expansion/contraction motion of the piezoelectric element 430.

Figure 9:
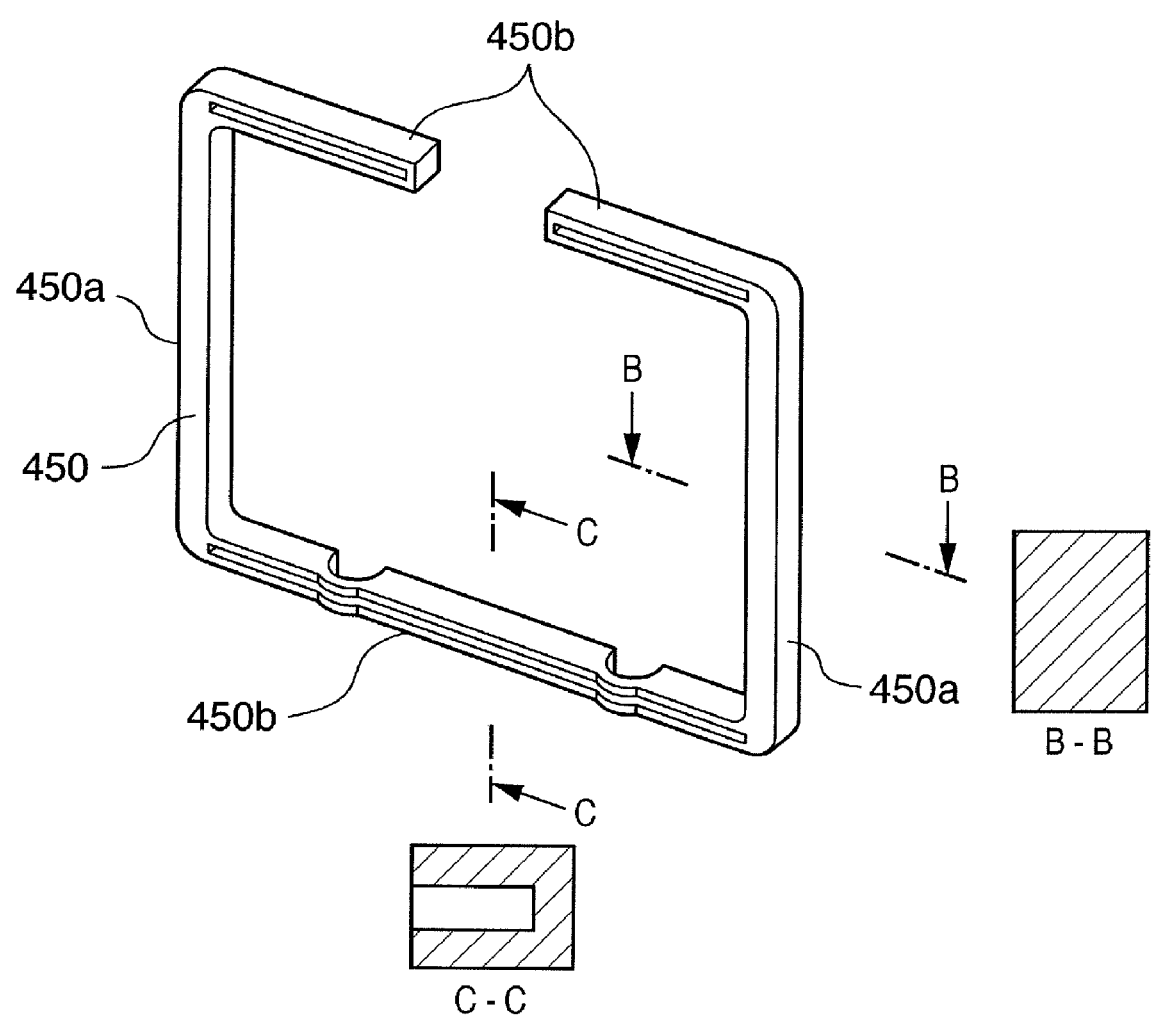
FIG. 9 is a view showing details of an elastic member.

A frame-like elastic member 450 as shown in FIGS. 8 and 9 are inserted in the gap between the low-pass filter holding member 420 and the four sides of the optical low-pass filter 410.

FIG. 9 is a view showing details of the elastic member 450.

The elastic member 450 includes an arm portion 450a extending in the expansion/contraction direction of the piezoelectric element 430, and an arm portion 450b extending in a direction perpendicular to the expansion/contraction direction. The arm portion 450a and arm portion 450b have different rigidities. That is, to allow the optical low-pass filter 410 to swing while following the expansion/contraction of the piezoelectric element 430, the arm portion 450b which receives an expansion/contraction action has a lower rigidity than the arm portion 450a in the elastic member 450. More specifically, the arm portion 450a has a rectangular cross section B-B, while the arm portion 450b has a cross section C-C with a partially hollow rectangular shape.

The arrangement which changes the rigidity between the arm portion 450a and the arm portion 450b is not limited to this. For example, arm portions formed from different members may be integrated by, e.g., coinjection molding.

On the four sides around the optical low-pass filter 410, the piezoelectric element 430 and elastic member 450 seal the low-pass filter holding member 420 not to form any gap.

In the second embodiment, the piezoelectric element 430 uses a stacked piezoelectric element in which generally known piezoelectric bodies and internal electrodes are alternately stacked. The piezoelectric element 430 also adopts a d33 type stacked piezoelectric element which applies a voltage in the stacking direction of the piezoelectric body. This makes it possible to obtain a larger amplitude (displacement) in the stacking direction. That is, it is possible to largely displace the optical low-pass filter 410 in the vibration direction. It is also possible to use various other kinds of piezoelectric elements as long as the optical low-pass filter 410 is displaced in its in-plane direction, i.e., a direction perpendicular to the optical axis.

In the second embodiment, the piezoelectric element 430 has a cross section perpendicular to its stacking direction (the vibration direction of the optical low-pass filter 410) with a dimension in the optical axis direction, which is almost equal to the thickness of the optical low-pass filter 410. The cross section has a longer dimension in a direction perpendicular to the optical axis direction and vibration direction to increase the area of piezoelectric bodies to be stacked. This prevents an increase in dimension of the camera along the optical axis direction while attaining a larger force.

Forming the piezoelectric element 430 to have the above-described cross section increases the allowable buckling stress with respect to its rotation within a plane perpendicular to the optical axis. This makes it possible to prevent the buckling fracture of the piezoelectric element even when the optical low-pass filter 410 vibrates with a rotational component within a plane perpendicular to the optical axis.

Figure 10:
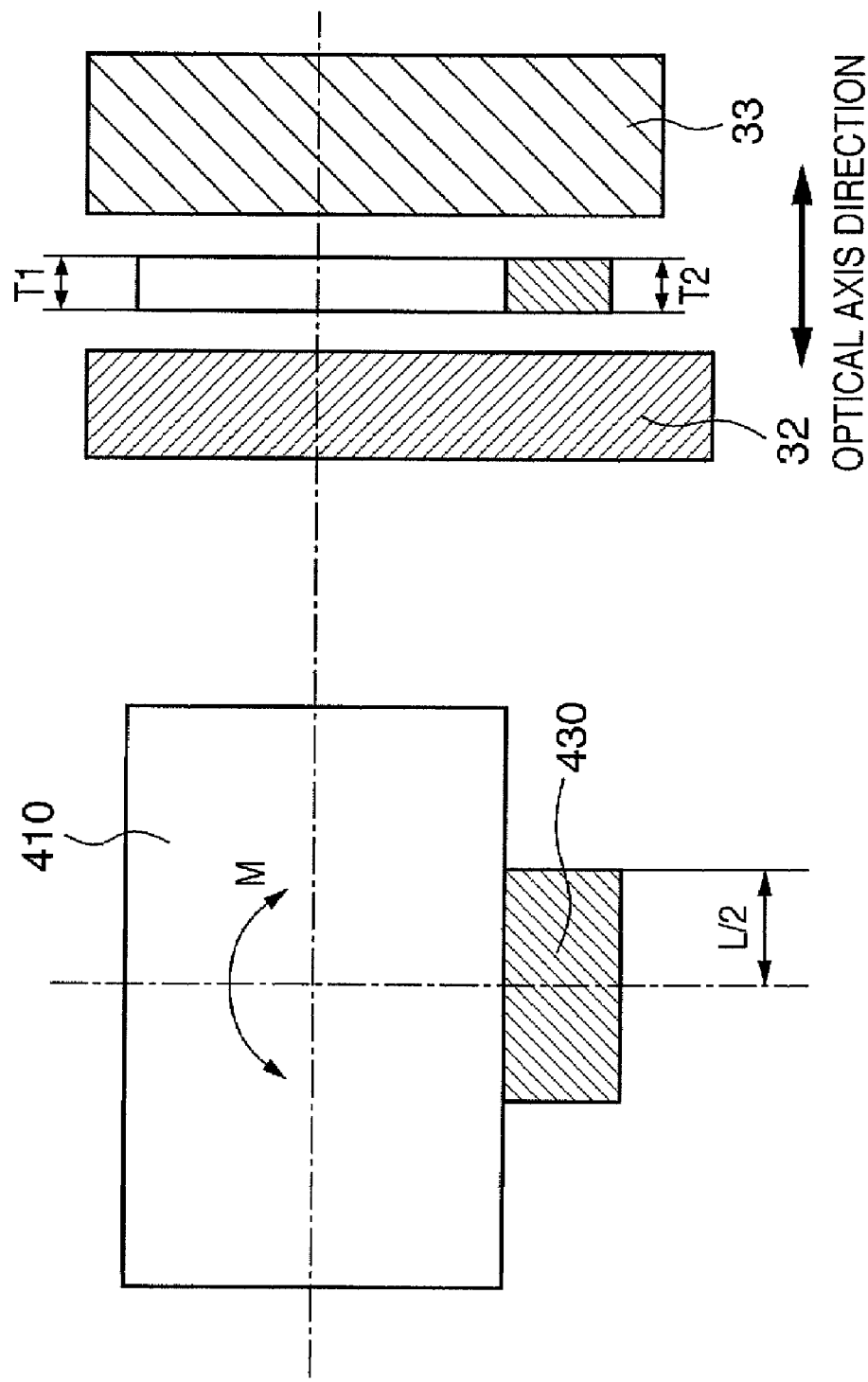
FIG. 10 is a conceptual view for explaining a force produced upon vibrating the optical low-pass filter.

An additional explanation of this mechanism will be given with reference to FIG. 10.

Letting L be the length of the piezoelectric element 430 in a direction perpendicular to its expansion/contraction direction (vibration direction), a force which is produced by a moment M generated upon rotation of the optical low-pass filter 410 within a plane perpendicular to the optical axis and acts at the edge of the piezoelectric element 430 is given by:

$$\text{force } F = M/(L/2)$$

As is obvious from the above equation, the force F acting at the edge of the piezoelectric element changes depending on a dimension perpendicular to the expansion/contraction direction. Maximizing this dimension makes it possible to reduce the force acting at the edge of the piezoelectric element and to increase the allowable buckling stress by the moment M.

If a thickness T2 of the piezoelectric element 430 in the optical axis direction is equal to the length L, the piezoelectric element 430 interferes with the image sensor 33 on the eyepiece side and the focal plane shutter 32 on the objective side. Elimination of this interference requires widening the gap between the image sensor 33 and the focal plane shutter 32 to result in an increase in size of the camera. Preferably, the thickness T2 of the piezoelectric element 430 is smaller than the length L. Referring to FIG. 10, reference symbol T1 denotes the thickness of the optical low-pass filter 410.

Although the optical low-pass filter 410 directly abuts against the piezoelectric element 430 in the second embodiment, a spacer may be inserted between them. When a spacer is inserted between the optical low-pass filter 410 and the piezoelectric element 430, the piezoelectric element 430 needs only apply vibration to the spacer. This makes it possible to relax restriction on the layout.

As described above, the piezoelectric element 430 is held in a direction (the vertical direction of the camera) in which the direction of expansion/contraction due to voltage application becomes perpendicular to the optical axis. The piezoelectric element 430 is bonded and fixed to the low-pass filter holding member 420, but is merely in contact with the optical low-pass filter 410 without being bonded to it. That is, the vibration surface of the piezoelectric element 430 with respect to the optical low-pass filter 410 is not fixed to it.

The elastic member 450 supports the optical low-pass filter 410 to allow the optical low-pass filter 410 to move not only in the expansion/contraction direction of the piezoelectric element 430 but also in the image capturing optical axis direction by a predetermined amount. That is, the optical low-pass filter 410 is allowed to incline with respect to a plane perpendicular to the image capturing optical axis to some extent upon receiving vibration conducted from the piezoelectric element 430. With this arrangement, the foreign substance adhering on the optical low-pass filter 410 can be accelerated even in the image capturing optical axis direction to result in more preferable foreign substance removal. However, if the optical low-pass filter 410 is allowed to incline with respect to a plane perpendicular to the image capturing optical axis, and the piezoelectric element 430 is bonded to the optical low-pass filter 410, a shearing stress acts on the piezoelectric element 430. Especially, the above arrangement is not preferable for a stacked piezoelectric element as in the second embodiment because it fractures due to such a shearing stress.

To solve the above problem, in the second embodiment, the vibration surface of the piezoelectric element 430 with respect to the optical low-pass filter 410 is not bonded to the optical low-pass filter 410 but is merely in contact with it. Even when the optical low-pass filter 410 inclines with respect to a plane perpendicular to the image capturing optical axis, no shearing stress acts on the piezoelectric element 430. That is, as the optical low-pass filter 410 inclines with respect to a plane perpendicular to the image capturing optical axis, the vibration surface of the piezoelectric element 430 relatively shifts from the contact surface of the optical low-pass filter 410. The piezoelectric element 430 never directly receives the rotation force.

At the same time, as the vibration surface of the piezoelectric element 430 is not bonded to the optical low-pass filter 410, the followability of the optical low-pass filter 410 with respect to the vibration of the piezoelectric element 430 suffers. As described above, this problem is dealt with by arranging the optical low-pass filter 410 to be clamped between the piezoelectric element 430 and the biasing member 440 within the same plane. That is, the optical low-pass filter 410 is biased using, e.g., a spring from the opposite side. This makes it possible to always bring the optical low-pass filter 410 into contact with the piezoelectric element 430 even when the piezoelectric element 430 is driven in the contraction direction.

With this arrangement, preferable followability of the optical low-pass filter 410 with respect to the vibration is ensured while avoiding the fracture of the piezoelectric element 430 due to a shearing stress.

Figure 11:
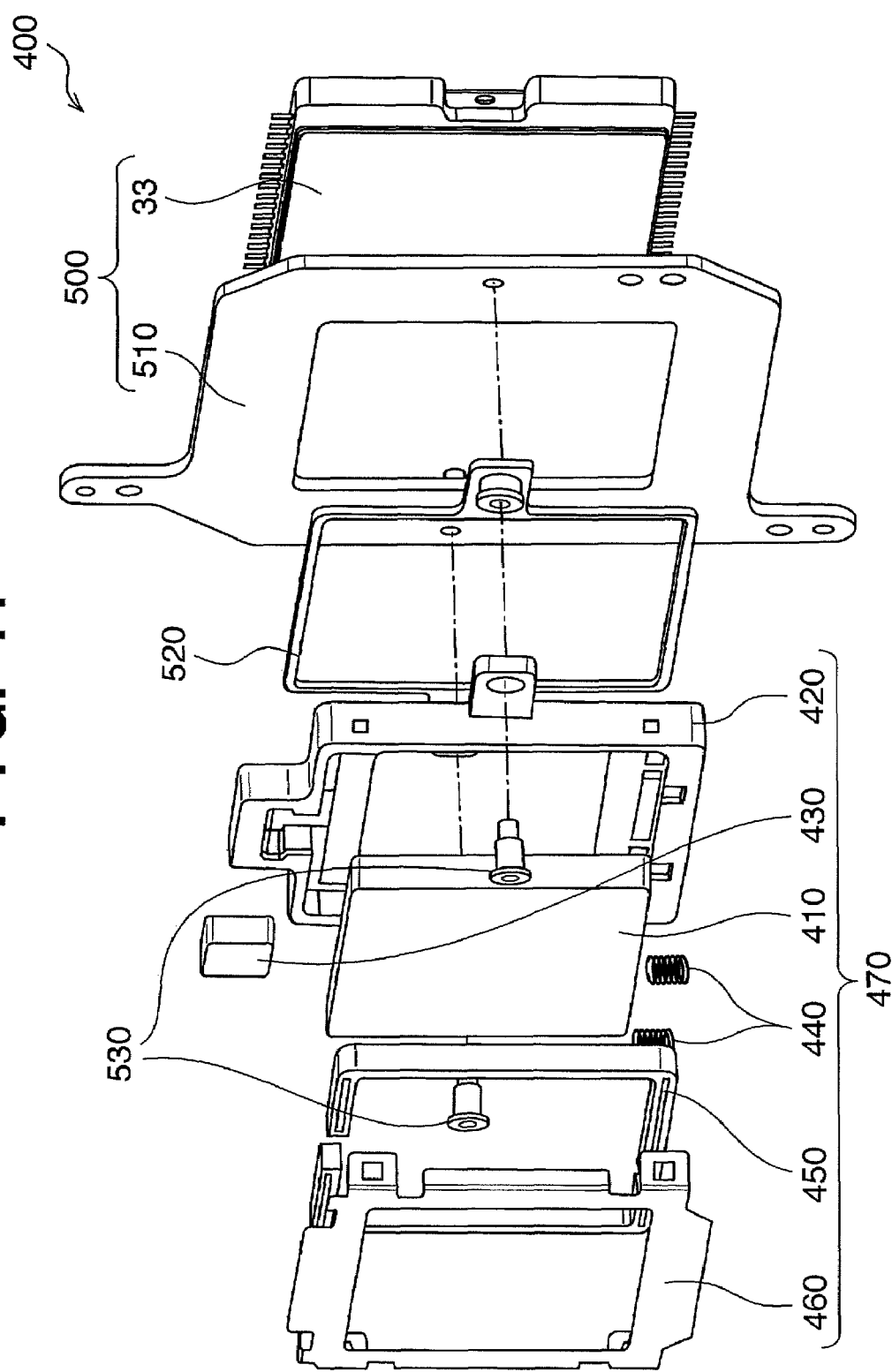
FIG. 11 is an exploded perspective view for explaining the constituent components of an image capturing unit.

FIG. 11 is an exploded perspective view for further explaining the constituent components of the image capturing unit 400 described with reference to FIGS. 6 and 7.

Reference numeral 500 denotes an image sensor unit which includes at least the image sensor 33 and image sensor holding member 510. Reference numeral 470 denotes the low-pass filter holding unit which includes at least the optical low-pass filter 410, low-pass filter holding member 420, piezoelectric element 430, biasing member 440, elastic member 450, and a regulating member 460.

The regulating member 460 and low-pass filter holding member 420 clamps the optical low-pass filter 410 at predetermined gaps in the image capturing optical axis direction. This regulates the movement of the optical low-pass filter 410 in the image capturing optical axis direction. Such regulation prevents the optical low-pass filter 410 from inclining with respect to a plane perpendicular to the image capturing optical axis at a predetermined angle or more.

The regulating member 460 also has an opening portion for regulating the opening of the optical low-pass filter 410 to shield the image capturing light beam which enters portions other than the opening portion. This prevents the image capturing light beam from entering the image sensor from the peripheral portion of the optical low-pass filter 410 so that the reflected light does not cause any ghost.

Reference numeral 520 denotes the elastic rubber sheet. A stepped screw 530 locks the arm portion 420b of the low-pass filter holding member 420 to the image sensor holding member 510 through the rubber sheet 520 to lock the low-pass filter holding unit 470 to the image sensor unit 500.

Figure 12:
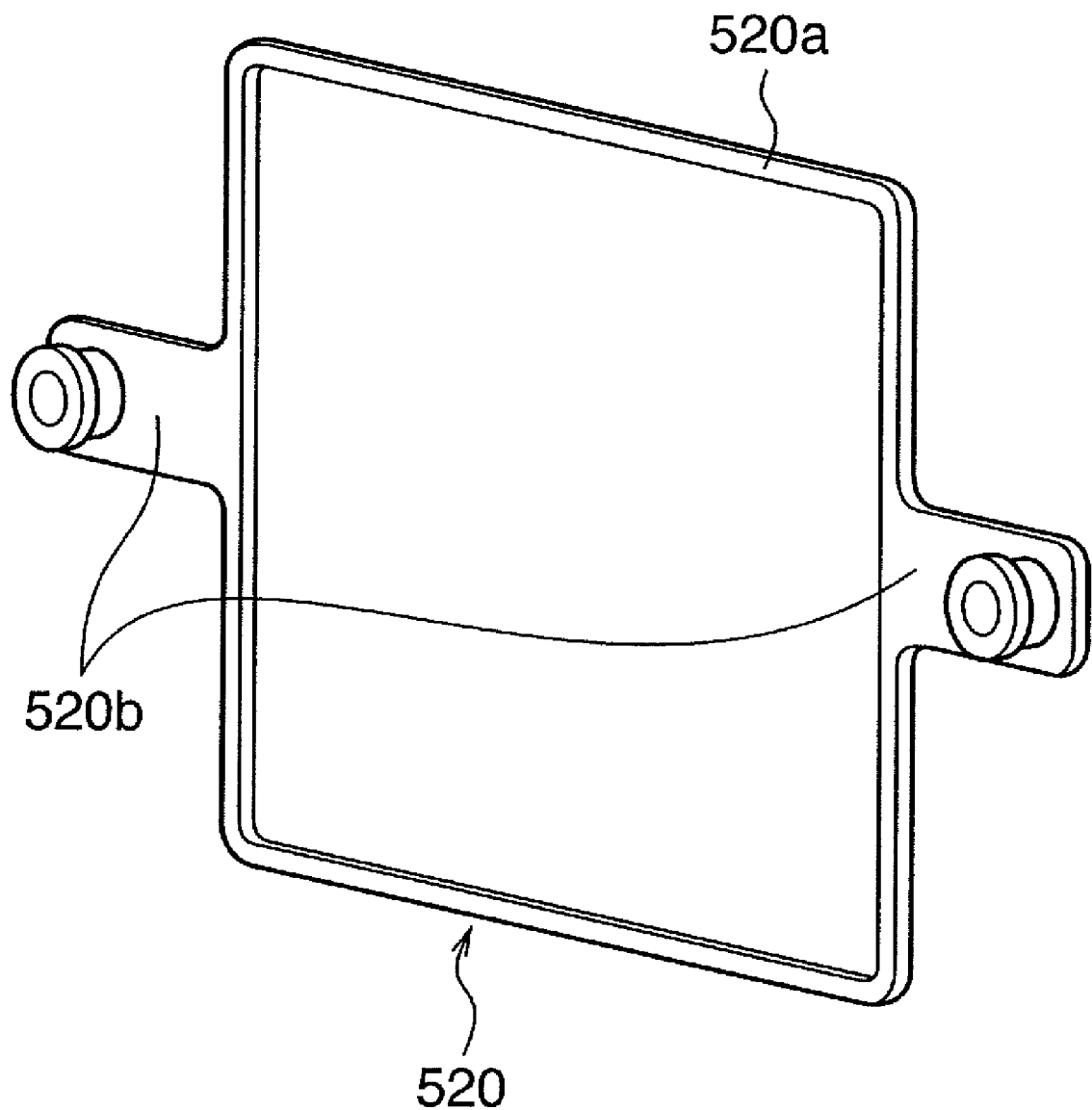
FIG. 12 is a view showing details of the components of a rubber sheet.

FIG. 12 is a view for explaining details of the rubber sheet 520. As shown in FIG. 12, the rubber sheet 520 is configured by integrally forming a frame portion 520a and two arm portions 520b. The two arm portions 520b each have a support portion for supporting the stepped screw 530 and oppose each other.

The surface of the frame portion 520a on the image sensor 33 side is in tight contact with the image sensor holding member 510, while the surface of the frame portion 520a on the optical low-pass filter 410 side is in tight contact with the frame portion 420a of the low-pass filter holding member 420. With this arrangement, the rubber sheet 520 seals the interval between the low-pass filter holding member 420 and the image sensor 33, while the piezoelectric element 430 and elastic member 450 seal the interval between the optical low-pass filter 410 and the low-pass filter holding member 420. The space between the optical low-pass filter 410 and the image sensor 33 becomes an enclosed space for preventing the entrance of a foreign substance such as dirt.

Even when the piezoelectric element 430 vibrates, the vibration of the low-pass filter holding unit 470 is hardly conducted to the image sensor 33 because the rubber sheet 520 forms a floating support structure using its elasticity.

Although a rubber sheet has exemplified the constituent component 520 in the second embodiment, the present invention is not limited to this as long as the constituent component 520 is made of a member which has an airtightness high enough to prevent the entrance of a foreign substance, and a vibrational absorbability high enough not to conduct the vibration of the optical low-pass to the image sensor 33. For example, a member such as a gel sheet or a double-sided tape made of sponge having a predetermined thickness is applicable to the constituent component 520.

The vibration of the optical low-pass filter 410 will be explained.

When the MPU 100 serving as a control means instructs the piezoelectric element driving circuit 111 for driving the piezoelectric element 430 to apply a predetermined cycle voltage to the piezoelectric element 430, the piezoelectric element 430 vibrates while expanding/contracting in a direction almost perpendicular to the optical axis (the vertical direction of the camera). The optical low-pass filter 410 is located to be clamped between the piezoelectric element 430 and the biasing member 440 in almost the same in-plane direction. Since the optical low-pass filter 410 and piezoelectric element 430 are held to be always in contact with each other, the vibration of the piezoelectric element 430 is conducted to the optical low-pass filter 410.

As described above, the rubber sheet 520 seals the interval between the low-pass filter holding member 420 and the image sensor 33, while the piezoelectric element 430 and elastic member 450 seal the interval between the optical low-pass filter 410 and the low-pass filter holding member 420. The space between the optical low-pass filter 410 and the image sensor 33 is an enclosed space free from any entrance of dirt or the like. At the same time, the image sensor unit 500 and the low-pass filter holding unit 470 including, e.g., the optical low-pass filter 410 clamp the rubber sheet 520. The rubber sheet 520 absorbs the vibration of the low-pass filter holding unit 470. The vibration of the low-pass filter holding unit 470 is hardly conducted to the image sensor 33.

With this arrangement, the vibration of the piezoelectric element 430, if any, hardly affects the image sensor 33. This makes it possible to limit the structure which receives vibration and, especially, to selectively vibrate the optical low-pass filter 410 to be vibrated. It is therefore possible to minimize the total mass of the structure which receives vibration. The piezoelectric element 430 can be driven with smaller energy.

The vibration of the optical low-pass filter 410 is hardly conducted to the image sensor 33. This makes it possible to prevent damage such as bond removal of the image sensor 33. When an impact acts on the camera, it is hardly conducted to the piezoelectric element 430. This makes it possible to prevent the piezoelectric element 430 from being damaged upon an impact applied to the camera.

As described above, the optical low-pass filter 410 and piezoelectric element 430 are not bonded, i.e., connected. Even when the piezoelectric element driving circuit 111 applies a predetermined cycle voltage to the piezoelectric element 430 to expand/contract it, a force in a direction in which the piezoelectric element 430 pushes out the optical low-pass filter 410 only acts on the piezoelectric element 430, and no force in a direction in which the optical low-pass filter 410 pulls the piezoelectric element 430 acts on the piezoelectric element 430 by an inertia force. This makes it possible to prevent damage such as removal of a stacked portion because an excessive tensile force never acts on the piezoelectric element 430 even when a high-frequency voltage in an ultrasonic range is applied to the piezoelectric element 430.

Figure 13:
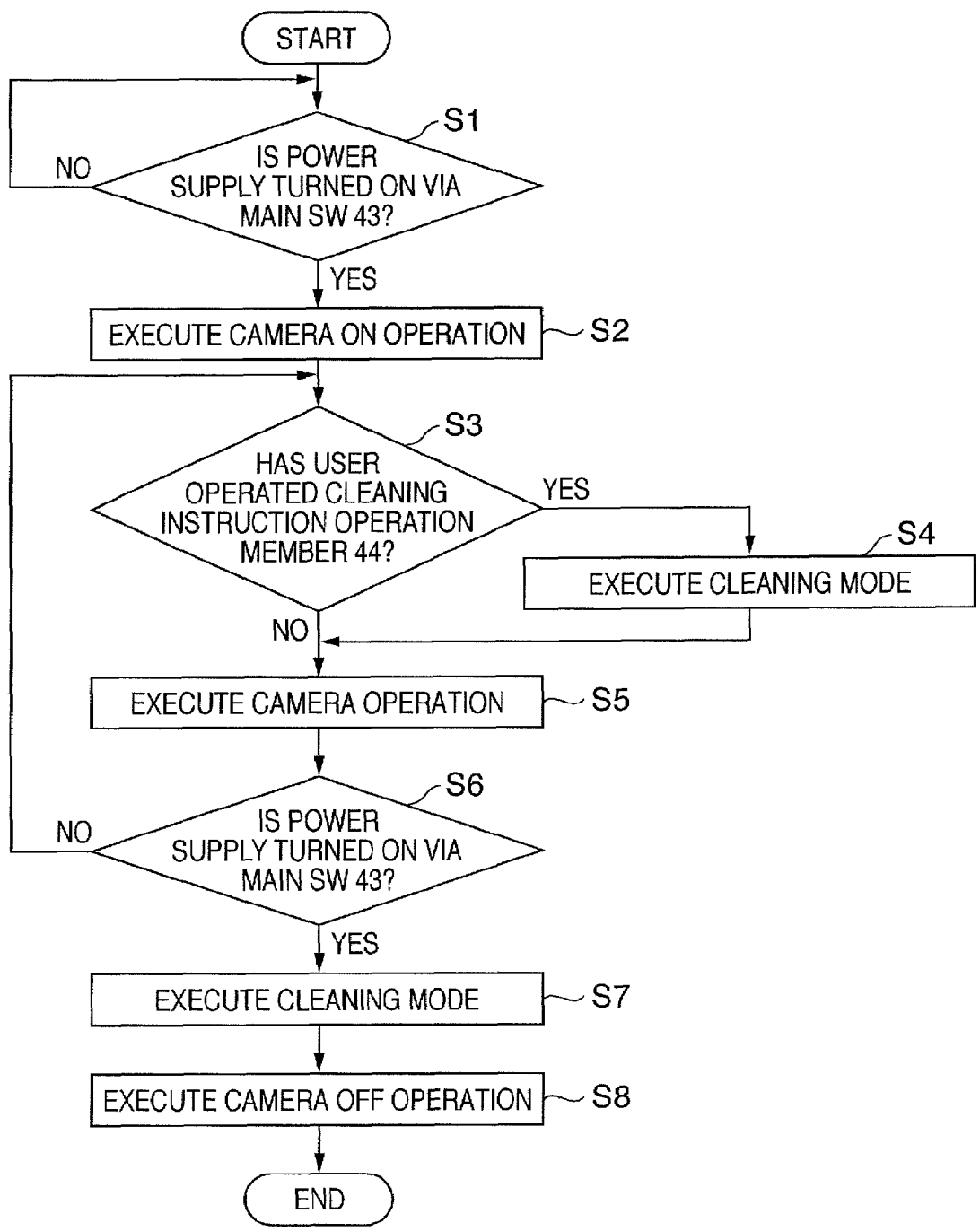
FIG. 13 is a flowchart for explaining the operation of the single-lens reflex digital camera according to the second embodiment.

An operation for removing the foreign substance such as dust adhering to the surface of the optical low-pass filter 410 according to the second embodiment will be explained with reference to the flowchart shown in FIG. 13.

The power supply is turned on via the main switch 43 in step S1 to activate the camera in step S2. More specifically, the MPU 100 controls the power supply circuit 110 to supply power to each circuit, initializes the camera, and executes a camera ON operation which allows an image capturing operation.

It is determined in step S3 whether the user has operated the cleaning instruction operation member 44. If the user has operated the cleaning instruction operation member 44 (YES in step S3), the process advances to step S4; otherwise (NO in step S3), the process advances to step S5.

Although the cleaning instruction operation member 44 is provided in the second embodiment, the present invention is not limited to this. The operation member for issuing an instruction to shift the camera main body 1 to a cleaning mode is not limited to a mechanical button. For example, there is available a method of issuing an instruction using a cursor key or instruction button from a menu displayed on the color liquid crystal monitor 19.

Upon receiving the cleaning mode start command, the MPU 100 shifts the camera main body 1 to a cleaning mode in step S4. The cleaning mode is a mode for causing the piezoelectric element 430 to vibrate the optical low-pass filter 410 to shake off the foreign substance adhering to the surface of the optical low-pass filter 410.

As the cleaning mode starts, the power supply circuit 110 supplies power necessary for the cleaning mode to the units in the camera main body 1 as needed. Parallel to this operation, the remaining battery level of the power supply unit 42 is detected to transmit the detection result to the MPU 100.

Upon receiving the cleaning mode start signal, the MPU 100 sends a driving signal to the piezoelectric element driving circuit 111. Upon receiving the driving signal from the MPU 100, the piezoelectric element driving circuit 111 generates a cycle voltage for driving the piezoelectric element 430, and applies it to the piezoelectric element 430. The piezoelectric element 430 expands/contracts in accordance with the applied voltage. As the piezoelectric element 430 expands, the optical low-pass filter 410 moves in a direction perpendicular to the optical axis (in-plane direction) upon being pushed out by the piezoelectric element 430, and the biasing member 440 contracts by the movement amount of the optical low-pass filter 410. As the piezoelectric element 430 contracts, the optical low-pass filter 410 is biased against the piezoelectric element 430 by the biasing member 440 to move while following the contraction motion of the piezoelectric element 430. As the piezoelectric element driving circuit 111 applies a cycle voltage to the piezoelectric element 430, the above-described motion repeats itself so that the optical low-pass filter 410 vibrates in a direction perpendicular to the optical axis, i.e., the in-plane direction while following cyclic expansion/contraction of the piezoelectric element 430.

When the cleaning mode is complete, the process advances to step S5.

Upon receiving signals from the SW1 7a, SW2 7b, main operation dial 8, sub operation dial 20, image capture mode setting dial 14, and other switches, the MPU 100 executes a camera operation such as image capture/setting of the camera in step S5. Since this operation is generally known, a detailed description thereof will be omitted.

It is determined in step S6 whether the camera has been powered off via the main switch 43 in a camera standby state. If the camera has been powered off (YES in step S6), the process advances to step S7; otherwise (NO in step S6), the process returns to step S3.

In step S7, the same operation in the cleaning mode as that in step S4 is executed. The process then advances to step S8.

In the cleaning mode in step S7, the piezoelectric element 430 may be driven by changing its parameters such as the driving frequency, driving time, and control method from those used in step S4 in consideration of the power consumption and operation time of the camera.

In step S8, the MPU 100 of the camera main body 1 controls to shut down each circuit, store necessary information and the like in the EEPROM 100a, and control the power supply circuit 110 to execute a power OFF operation for shutting off power supply to desired circuits.

As described above, according to the second embodiment, the cleaning mode is executed to remove the foreign substance adhering on the optical low-pass filter 410, not only at a timing intended by the user but also when the camera is powered off. Subsequently, the camera is powered off.

Various kinds of foreign substances adhere on the optical low-pass filter 410. The present applicant and others have clarified by experiments that when a foreign substance is left adhering for a long period of time, it is hardly removed even by vibration in the cleaning mode. This phenomenon is supposed to occur because the adhesion force such as a liquid cross-linking force increases as the foreign substance condenses upon a change in environment, i.e., temperature/humidity, or because the foreign substance gets higher adhesion as the dirt repeatedly swells and dries upon a change in temperature/humidity. Also, an elastic material such as rubber gets higher adhesion because fat and oil contained in itself bleed over time.

Executing the cleaning mode at the power OFF operation timing, after which the user leaves the camera unused for a long period of time at a high probability, makes it possible to more efficiently/effectively remove the foreign substance. This operation can be said to be more efficient/effective than foreign substance removal at the power ON operation timing before which the user has left the camera unused for a long period of time, and it has become hard to remove the dirt at a high probability. Note that the power OFF operation timing does not indicate the power OFF moment, but implies a case in which the foreign substance is removed with a slight time lag from power OFF.

The second embodiment has been described with reference to the case in which the foreign substance is removed upon the power OFF operation via the main switch 43. However, even in a camera OFF operation similar to power OFF after the elapse of a predetermined period of time in an ON state, the same effect can be produced as long as the cleaning mode (foreign substance removal) is executed in advance. For example, the cleaning mode may be done at the timing for shifting to a sleep state in which power supply to the system is temporarily limited to save power.

The description that the foreign substance is removed upon the power OFF operation via the main switch 43 indicates that the OFF operation signal from the main switch 43 is transmitted to the MPU 100 and the MPU 100 issues a command to cause the piezoelectric element driving circuit 111 to remove the foreign substance. The description that the cleaning mode is executed at the timing for shifting to a sleep state also indicates that the MPU 100 issues a command at the timing for shifting to a sleep state to cause the piezoelectric element driving circuit 111 to remove the foreign substance.

Third Embodiment

Figure 15:
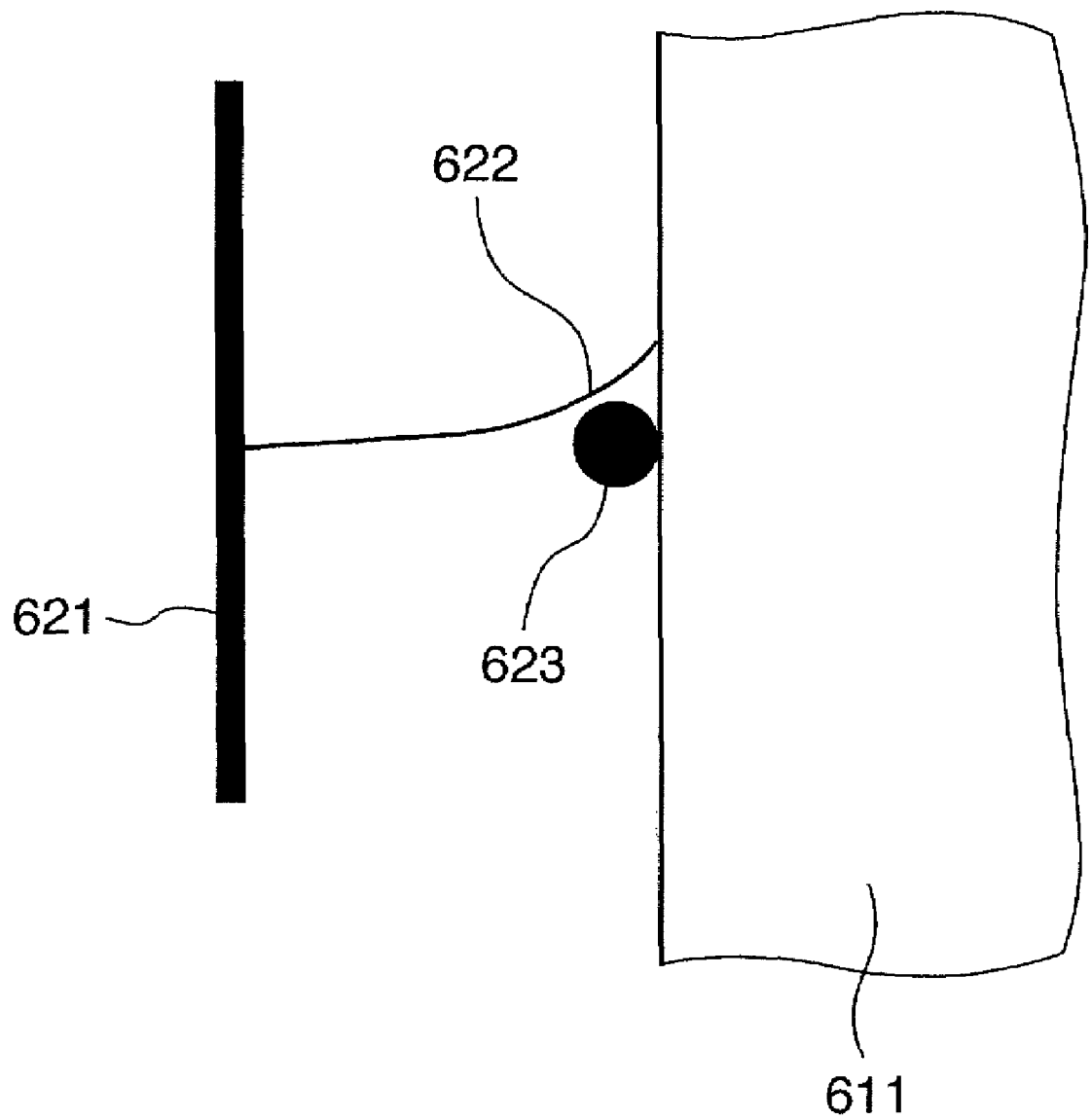
FIG. 15 is a view showing the device which removes dust adhering on the optical low-pass filter in the third embodiment.

Another form of the apparatus which removes a foreign substance adhering on an optical element such as an optical low-pass filter will be explained with reference to FIGS. 14 and 15.

An image capturing device 600 comprises an optical element 611 such as an optical low-pass filter, a holding member 612 for holding the optical element 611, and a solid-state image capturing unit 613 which includes a solid-state image sensor 613b and a cover member 613a for protecting the solid-state image sensor 613b. The image capturing device 600 also comprises a seal member 614 for sealing the interval between the optical element 611 and the cover member 613a of the solid-state image capturing unit 613.

Reference numeral 621 denotes a lever which connects to a driving unit (not shown) and can travel in a direction indicated by an arrow D in FIG. 14 in parallel to the surface of the optical element 611. The lever 621 comprises an abrasion-resistant fiber 622 (e.g., Dyneema manufactured by Toyobo Co. Ltd.). The abrasion-resistant fiber 622 serves as a cleaning brush.

Reference numeral 623 denotes a foreign substance adhering on the optical element 611. The abrasion-resistant fiber 622 has a length adjusted to come into contact with the optical element 611.

The lever 621 is positioned at the upper portion of FIG. 14 and travels downward as the operation in the cleaning mode starts. Along with this, the abrasion-resistant fiber 622 also travels downward. When the abrasion-resistant fiber 622 travels downward while being in contact with the optical element 611, the foreign substance 623 adhering on the optical element 611 is shaken off. After scanning the surface of the optical element 611 downward, the abrasion-resistant fiber 622 returns to the upward original position.

Also in the third embodiment, the operation in the cleaning mode is done at the camera power OFF operation timing. That is, executing the cleaning mode at the power OFF operation timing, after which the user leaves the camera unused for a long period of time at a high probability, makes it possible to more efficiently/effectively remove the foreign substance.

Fourth Embodiment

Another form of the apparatus which removes a foreign substance adhering on an optical element such as an optical low-pass filter will be explained with reference to FIGS. 16 and 17.

An image capturing device 700 comprises an optical element 711 such as an optical low-pass filter, a holding member 712 for holding the optical element 711, and a solid-state image capturing unit 713 which includes a solid-state image sensor 713b and a cover member 713a for protecting the solid-state image sensor 713b. The image capturing device 700 also comprises a seal member 714 for sealing the interval between the optical element 711 and the cover member 713a of the solid-state image capturing unit 713.

Figure 16:
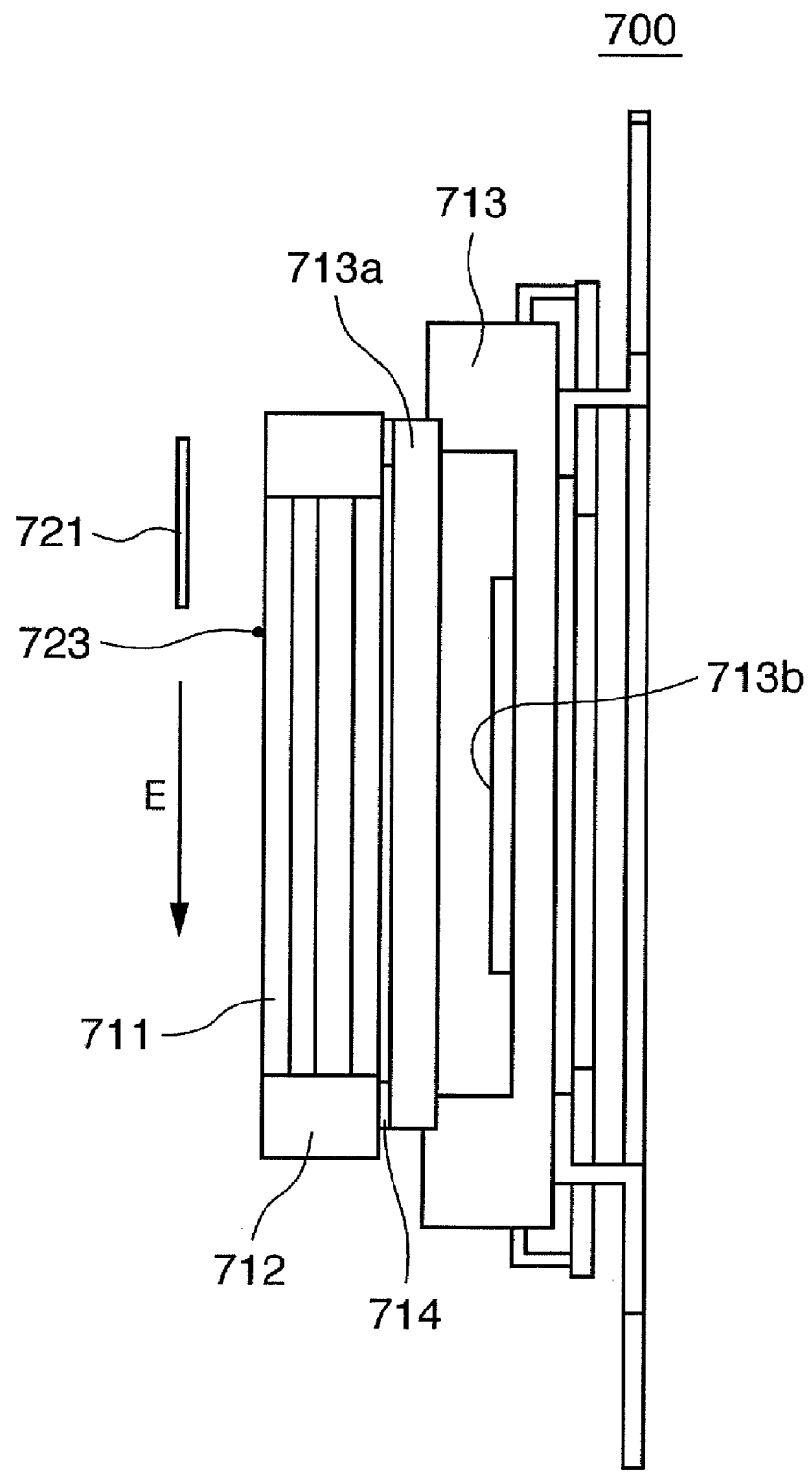
FIG. 16 is a view showing a device which removes dust adhering on an optical low-pass filter in the fourth embodiment.
Figure 17:
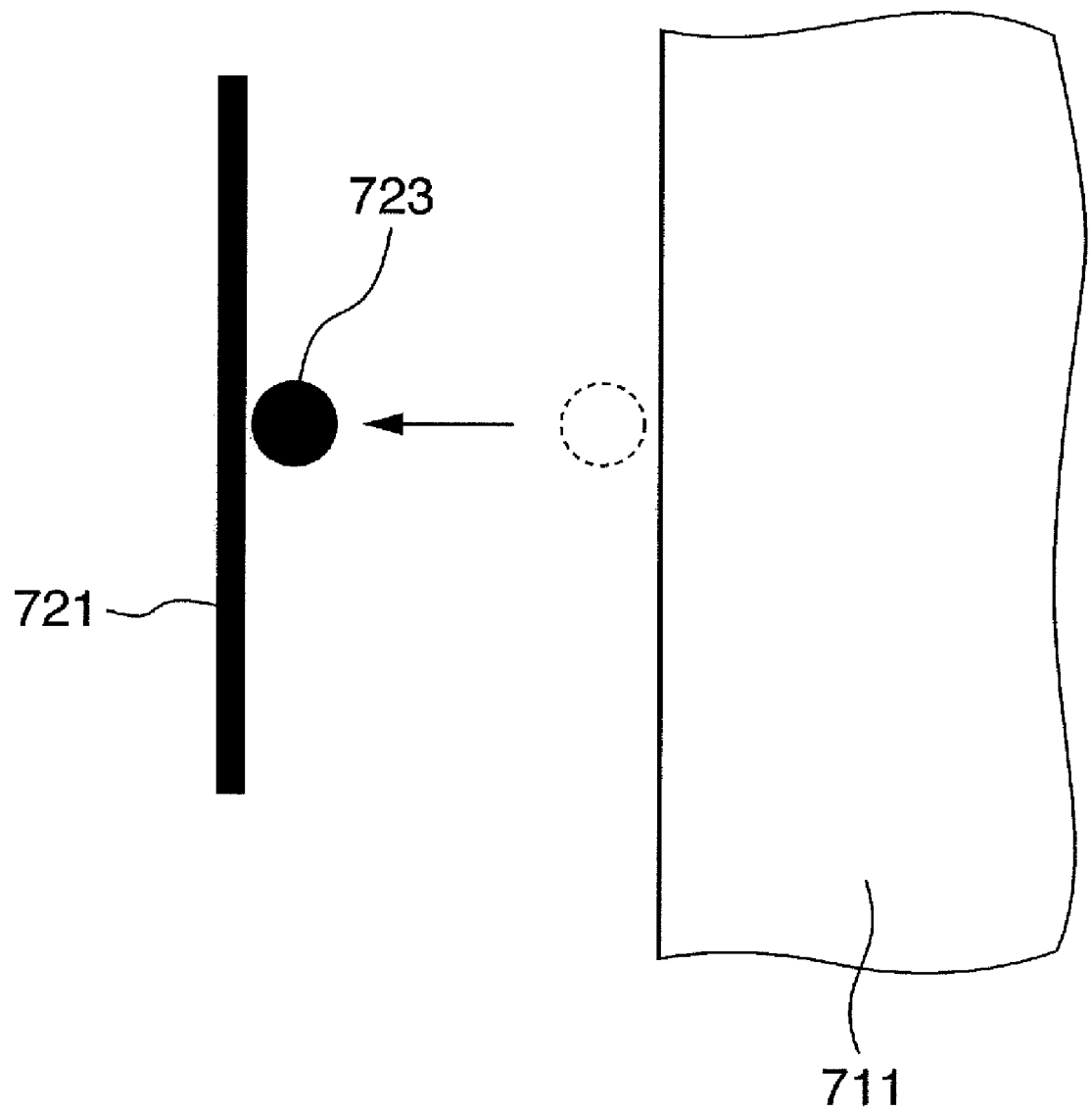
FIG. 17 is a view showing the device which removes dust adhering on the optical low-pass filter in the fourth embodiment.

Reference numeral 721 denotes an insulating portion which is made of polyimide and can travel in a direction indicated by an arrow E in FIG. 16 in parallel to the surface of the optical element 711. A coil (not shown) can switch the insulating portion 721 between a charged state and a charge-removed state. Reference numeral 723 denotes a foreign substance adhering on the optical element 711.

The insulating portion 721 is positioned at the upper portion of FIG. 16. As the operation in the cleaning mode starts, a predetermined voltage is applied to the coil (not shown). The insulating portion 721 is charged and travels downward.

As the insulating portion 721 is charged, if the charged foreign substance 723 is adhering to the surface of the optical element 711, the charged foreign substance 723 and insulating portion 721 produce an electrostatic force between themselves. The insulating portion 721 attracts by the electrostatic force (electrostatic attraction force) the foreign substance 723 against its adhesion force acting on the surface of the optical element 711. The foreign substance 723 attracted to the insulating portion 721 by the electrostatic force remains on the surface of the insulating portion 721. When the insulating portion 721 completes downward travel, the coil (not shown) applies, to the insulating portion 721, a voltage having a charge opposite to that applied in charging. The insulating portion 721 is then charge-removed. With this charge removing operation, the foreign substance 723 adhering to the surface of the insulating portion 721 by the electrostatic force separates and falls from the surface of the insulating portion 721 by gravity.

After that, the insulating portion 721 returns to the upward original position.

Also in the fourth embodiment, the operation in the cleaning mode is done at the camera power OFF operation timing. That is, executing the cleaning mode at the power OFF operation timing, after which the user leaves the camera unused for a long period of time at a high probability, makes it possible to more efficiently/effectively remove the foreign substance.

Other Embodiment

The object of each embodiment is achieved even by the following method. That is, a storage medium (or recording medium) which records software program codes for implementing the functions of the above-described embodiments is supplied to the system or apparatus. The computer (or CPU or MPU) of the system or apparatus reads out and executes the program codes stored in the storage medium. In this case, the program codes read out from the storage medium implement the functions of the above-described embodiments by themselves, and the storage medium which stores the program codes constitutes the present invention. In addition to the case in which the functions of the above-described embodiments are implemented when the readout program codes are executed by the computer, the present invention incorporates the following case. That is, the functions of the above-described embodiments are implemented when the operating system (OS) running on the computer performs part or all of actual processing on the basis of the instructions of the program codes.

The present invention also incorporates the following case. That is, the program codes read out from the storage medium are written in the memory of a function expansion card inserted into the computer or a function expansion unit connected to the computer. After that, the functions of the above-described embodiments are implemented when the CPU of the function expansion card or function expansion unit performs part or all of actual processing on the basis of the instructions of the program codes.

When the present invention is applied to the storage medium, the storage medium stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-063978, filed Mar. 9, 2006, and Japanese Patent Application No. 2006-198709, filed Jul. 20, 2006, which are hereby incorporated by reference herein in their entirety.

The invention claimed is:

1. An image capturing apparatus including an image sensor which photo-electrically converts an object image, comprising:
    a lens mount adapted to attach a lens to or detach the lens from the image capturing apparatus;
    a shutter unit adapted to transmit a light from an object to the image sensor or shield the image sensor from the light from the object;
    an optical element arranged between said shutter unit and the image sensor;
    a foreign substance removing unit adapted to remove a foreign substance adhering to a surface of said optical element;
    a first instruction unit adapted to issue a first instruction to operate said foreign substance removing unit in accordance with a user's request;
    a second instruction unit adapted to issue second instructions to power off the image capturing apparatus; and
    a control unit adapted to control said foreign substance removing unit to execute a first foreign substance removing operation in accordance with the first instruction and to control said foreign substance removing unit to execute a second foreign substance removing operation in accordance with the second instruction, operation parameter of the first foreign substance removing operation and operation parameter of the second foreign substance removing operation being different from each other.

2. The apparatus according to claim 1, wherein the second instruction is an instruction output from said second instruction unit when a power supply switch of the image capturing apparatus is turned off.

3. The apparatus according to claim 1, wherein the second instruction is an instruction output from said second instruction unit when the image capturing apparatus is to be shifted to a sleep state.

4. The apparatus according to claim 1, wherein said foreign substance removing unit includes vibration unit adapted to vibrate said optical element.

5. The apparatus according to claim 1, wherein said foreign substance removing unit includes sweep unit adapted to sweep the surface of said optical element.

6. The apparatus according to claim 1, wherein said foreign substance removing unit includes electrostatic attraction unit adapted to electrostatically attract the surface of said optical element.

7. A method of controlling an image capturing apparatus including an image sensor which photo-electrically converts an object image, a lens mount adapted to attach a lens to or detach the lens from the image capturing apparatus, a shutter unit adapted to transmit a light from an object to the image sensor or shield the image sensor from the light from the object, and an optical element arranged between the shutter unit and the image sensor, comprising:

a foreign substance removing step of removing a foreign substance adhering to a surface of the optical element;

a first instruction step of issuing a first instruction to operate said foreign substance removing unit in accordance with a user's request;

a second instruction step of issuing a second instructions to power off the image capturing apparatus; and a control step of controlling to execute the first foreign substance removing operation in the foreign substance removing step in accordance with first instruction and to control said foreign substance removing unit to execute a second foreign substance removing operation in accordance with the second instruction, operation parameter of the first foreign substance removing operation and operation parameter of the second foreign substance removing operation being different from each other.

\* \* \* \* \*